US008678868B2

(12) United States Patent  
Bailey et al.

(10) Patent No.: US 8,678,868 B2  
(45) Date of Patent: Mar. 25, 2014

(54) BOAT AND COMBINATION BOAT AND SNOWMOBILE

(76) Inventors: Roger W. Bailey, Gilford, NH (US); Edward G. Valpey, Gilford, NH (US)

( * ) Notice: Subject to any disclaimer, the term of this patent is extended or adjusted under 35 U.S.C. 154(b) by 0 days.

(21) Appl. No.: 13/406,046

(22) Filed: Feb. 27, 2012

(65) Prior Publication Data

US 2012/0216735 A1 Aug. 30, 2012

Related U.S. Application Data

(60) Provisional application No. 61/447,075, filed on Feb. 27, 2011.

(51) Int. Cl.  
*B63H 21/175* (2006.01)

(52) U.S. Cl.  
USPC .............................. 440/11; 114/248

(58) Field of Classification Search  
USPC ............................ 440/11; 114/248  
See application file for complete search history.

(56) References Cited

U.S. PATENT DOCUMENTS

| | | | | |
|---|---|---|---|---|
| 3,521,595 A | * | 7/1970 | Mix | 440/12.63 |
| 3,646,904 A | * | 3/1972 | Lanning et al. | 114/61.22 |
| 3,853,085 A | * | 12/1974 | Halboth | 440/11 |
| 4,275,678 A | * | 6/1981 | Bludworth | 114/248 |
| 5,184,564 A | * | 2/1993 | Robbins et al. | 114/345 |
| 5,746,150 A | * | 5/1998 | Beaulac et al. | 114/248 |
| 6,062,156 A | * | 5/2000 | Radke et al. | 114/144 R |
| 6,595,812 B1 | * | 7/2003 | Haney | 440/11 |
| 6,786,170 B2 | * | 9/2004 | Trowbridge | 114/259 |
| 8,375,880 B1 | * | 2/2013 | St. Clair et al. | 114/362 |
| 2011/0174093 A1 | * | 7/2011 | Pellegrini | 74/25 |
| 2012/0216735 A1 | * | 8/2012 | Bailey et al. | 114/55.55 |

* cited by examiner

*Primary Examiner* — S. Joseph Morano  
*Assistant Examiner* — Jovon Hayes  
(74) *Attorney, Agent, or Firm* — Michael J. Persson; Catherine E. Napjus; Lawson, Persson & Weldon-Francke, P.C.

(57) ABSTRACT

A boat capable of having a snowmobile securely mounted on its hull and steerable by the snowmobile's steering mechanism. The boat includes a bow, an aft, a port side, a starboard side, and a mid-ship. The hull of the boat includes a top and a bottom, wherein the bottom of the hull includes under-hull skis with tips and tails, and the bottom of the hull further includes a bow step positioned proximate to the tips of the under-hull skis. The boat also includes: a snowmobile opening including a cutaway of the hull extending into the hull from the aft and disposed halfway between the port and starboard sides; a transom disposed at the aft; and a boat steering mechanism including two boat ski attachment mechanisms on the port and starboard sides of the boat and two snowmobile ski attachment mechanisms on the port and starboard sides.

20 Claims, 21 Drawing Sheets

174

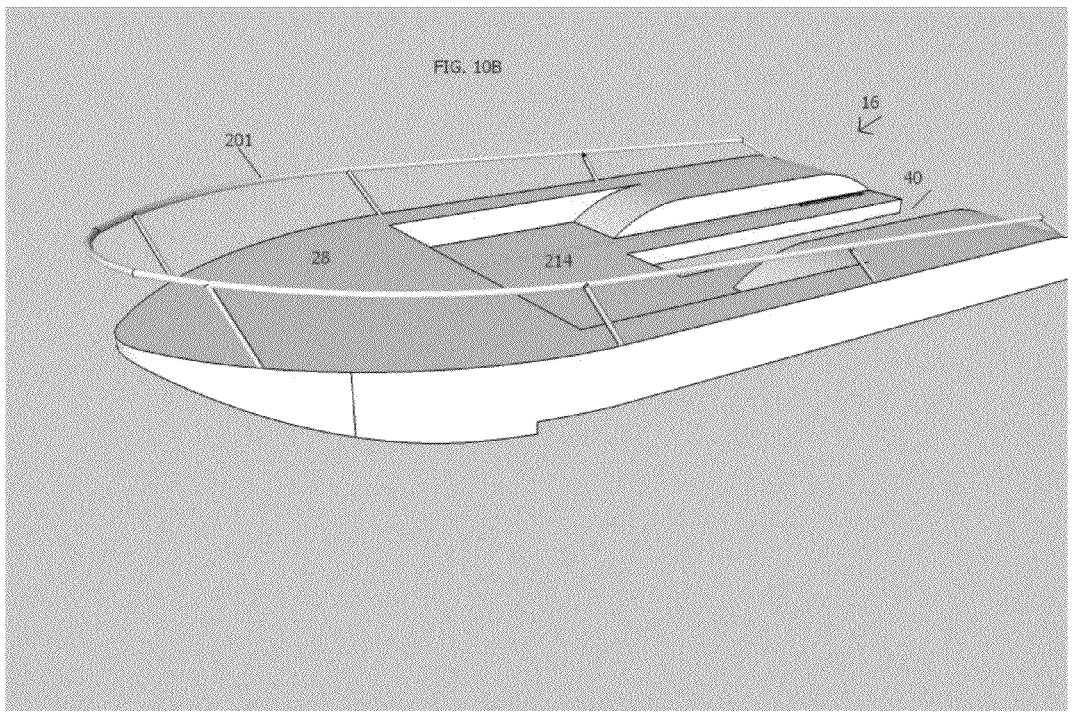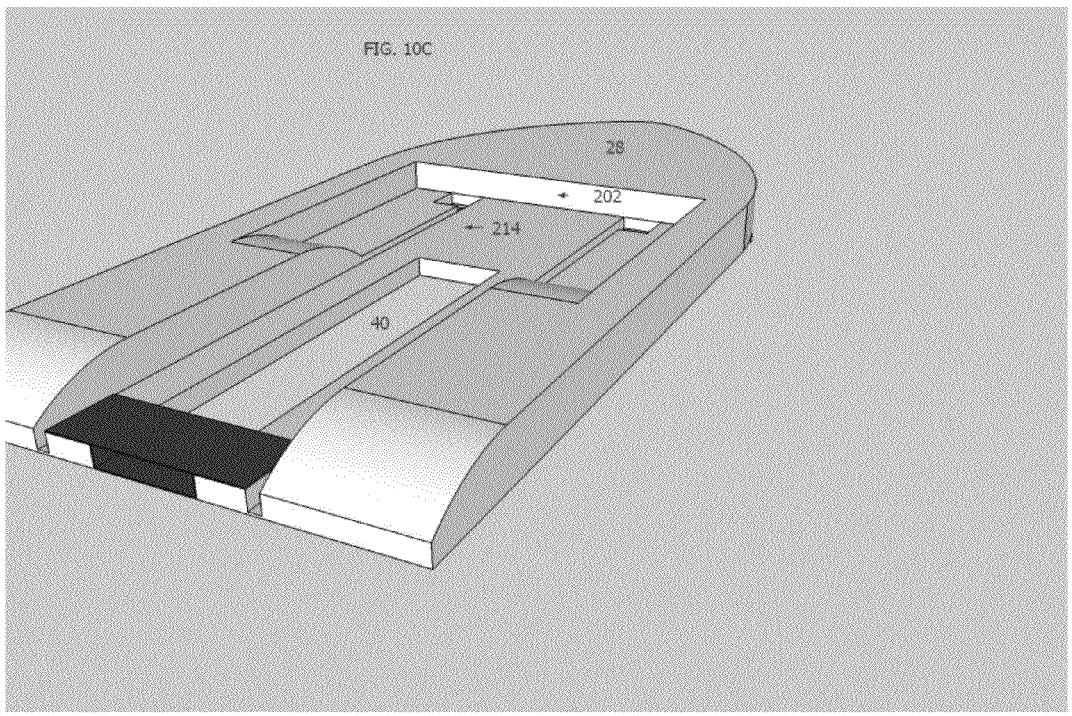

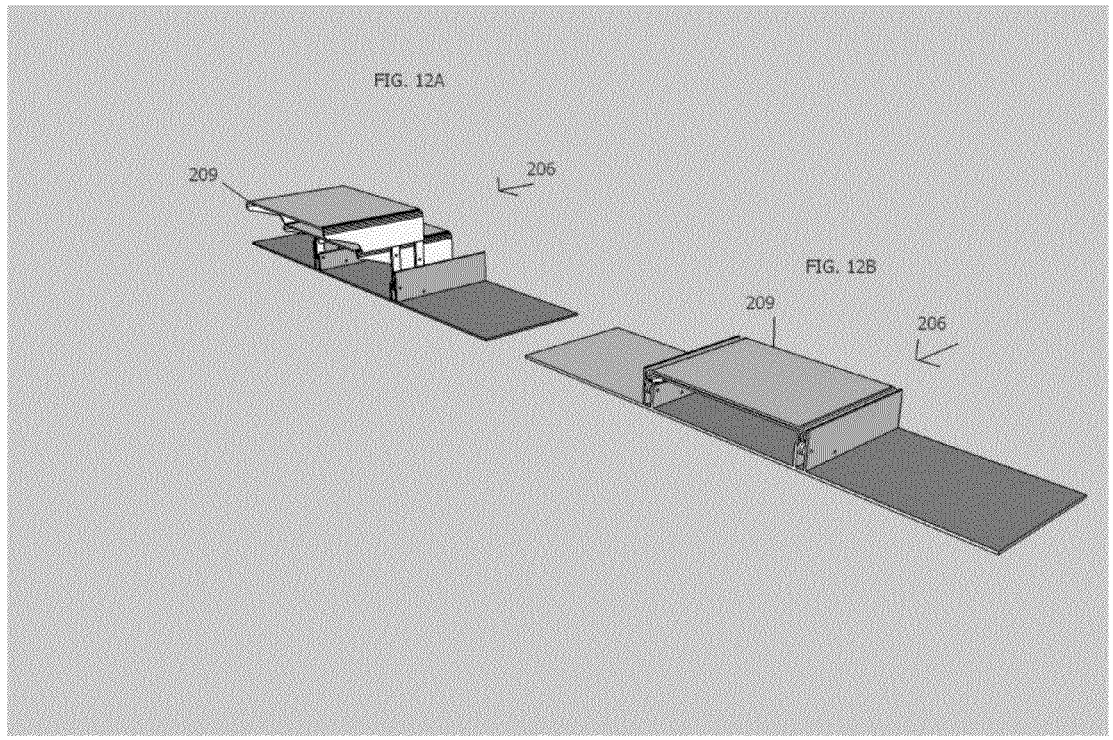
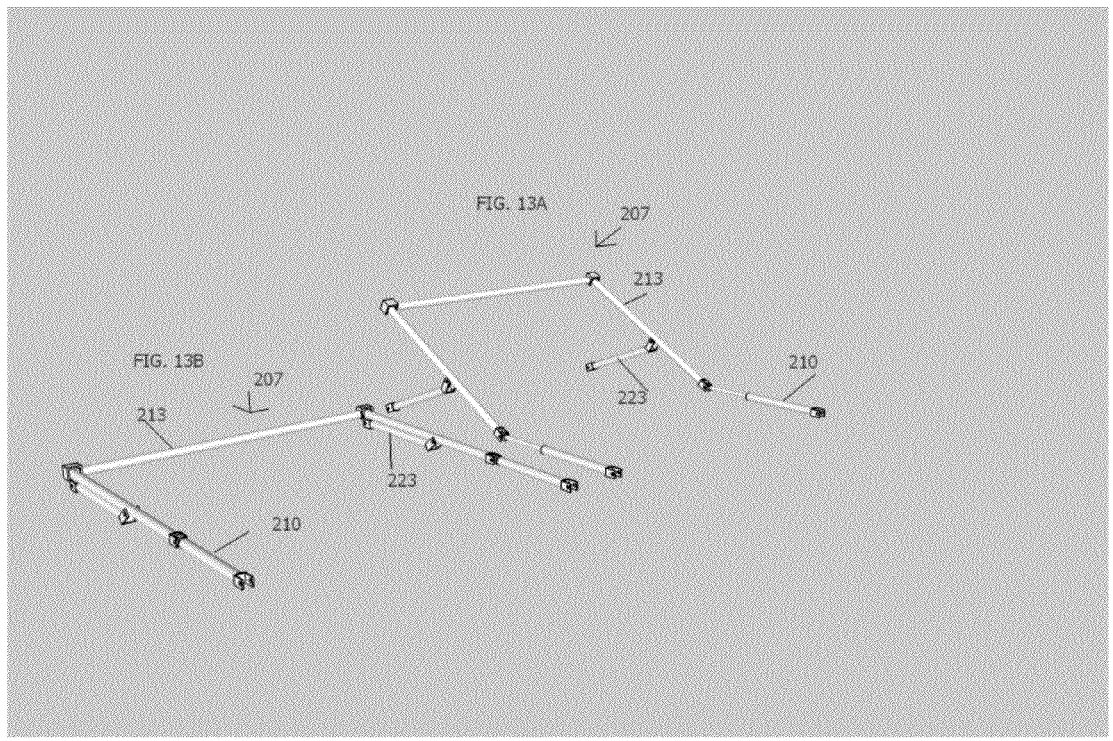

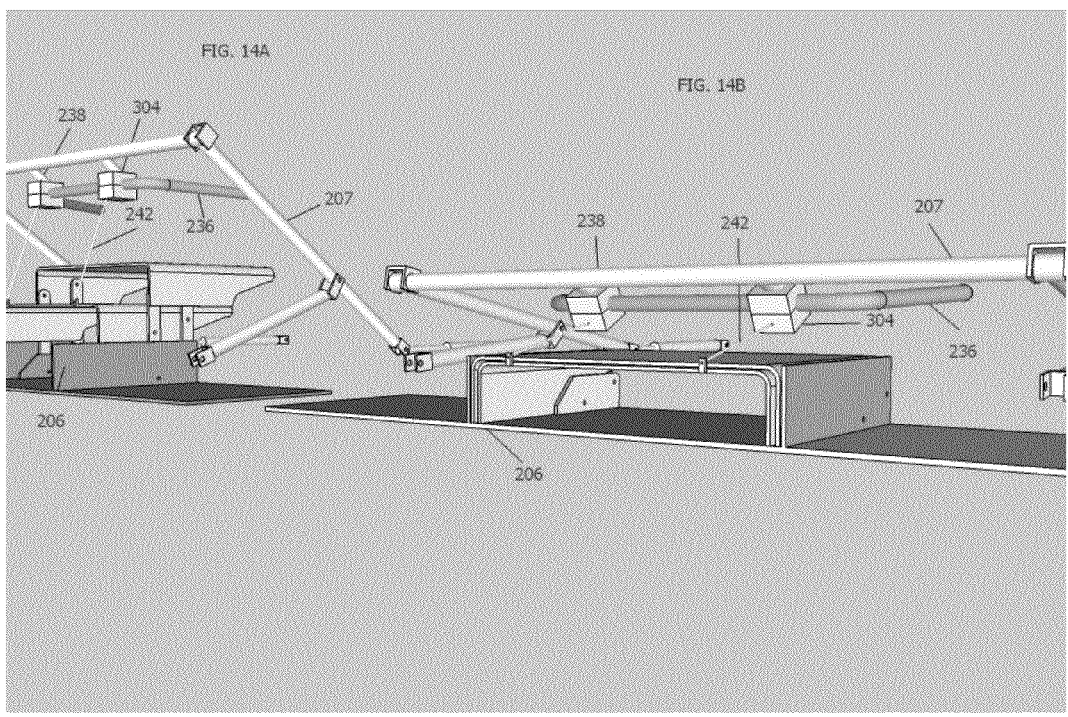

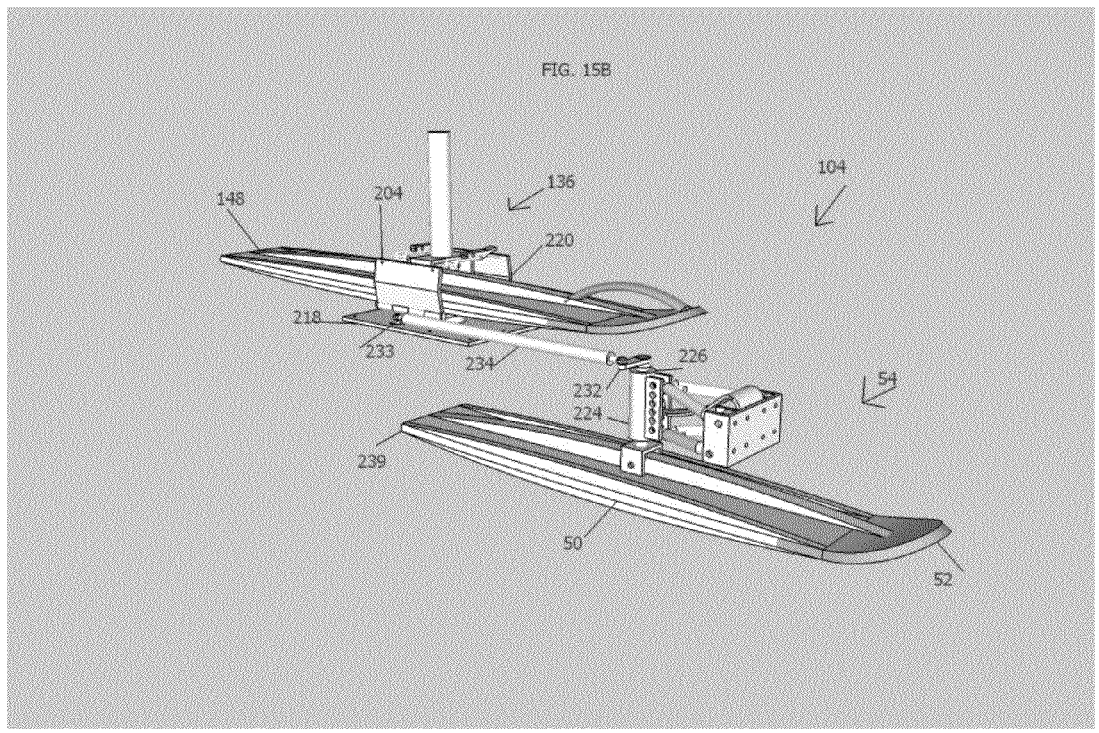
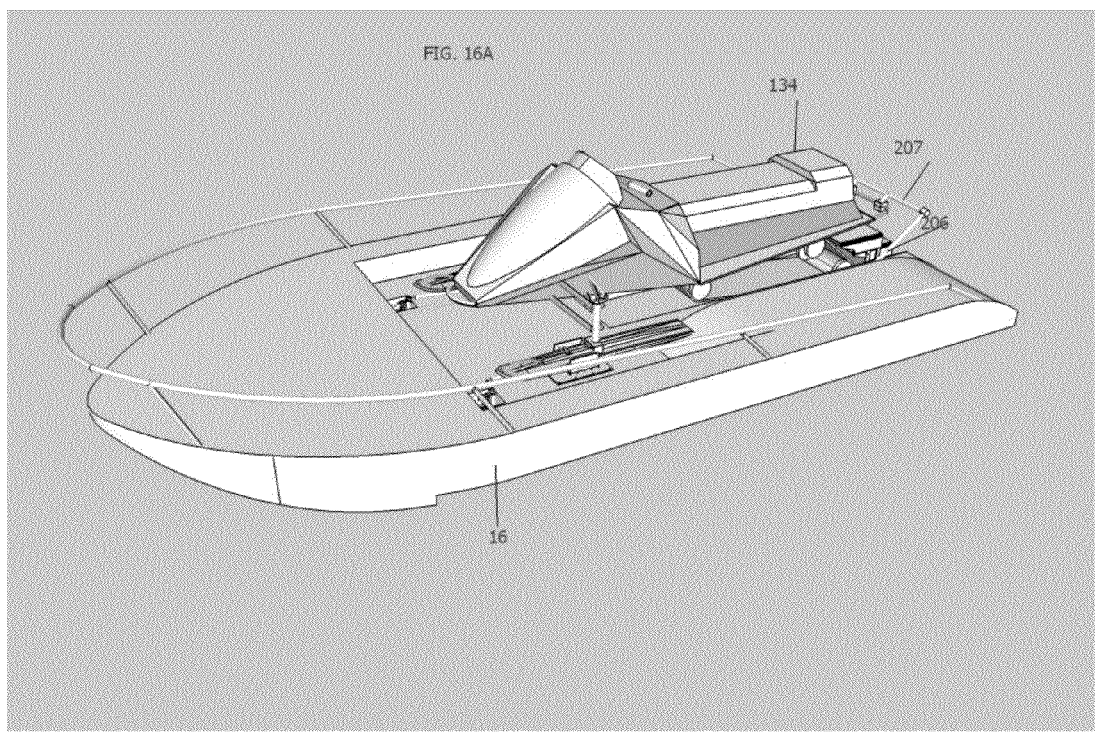

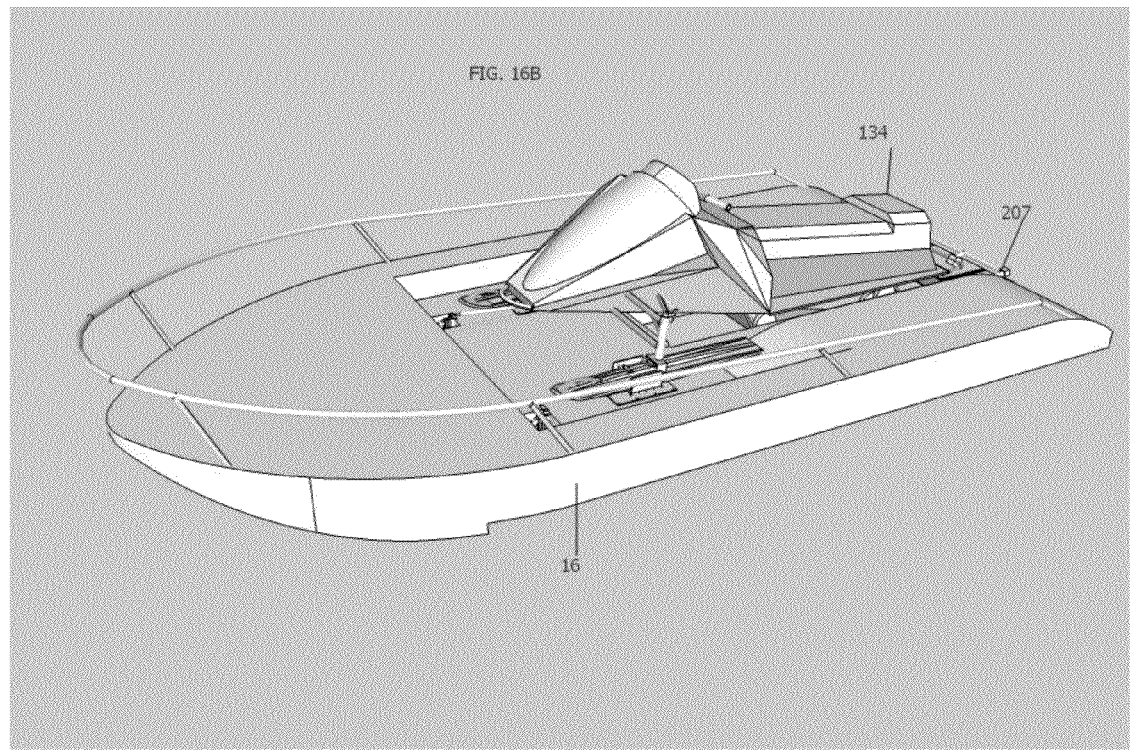
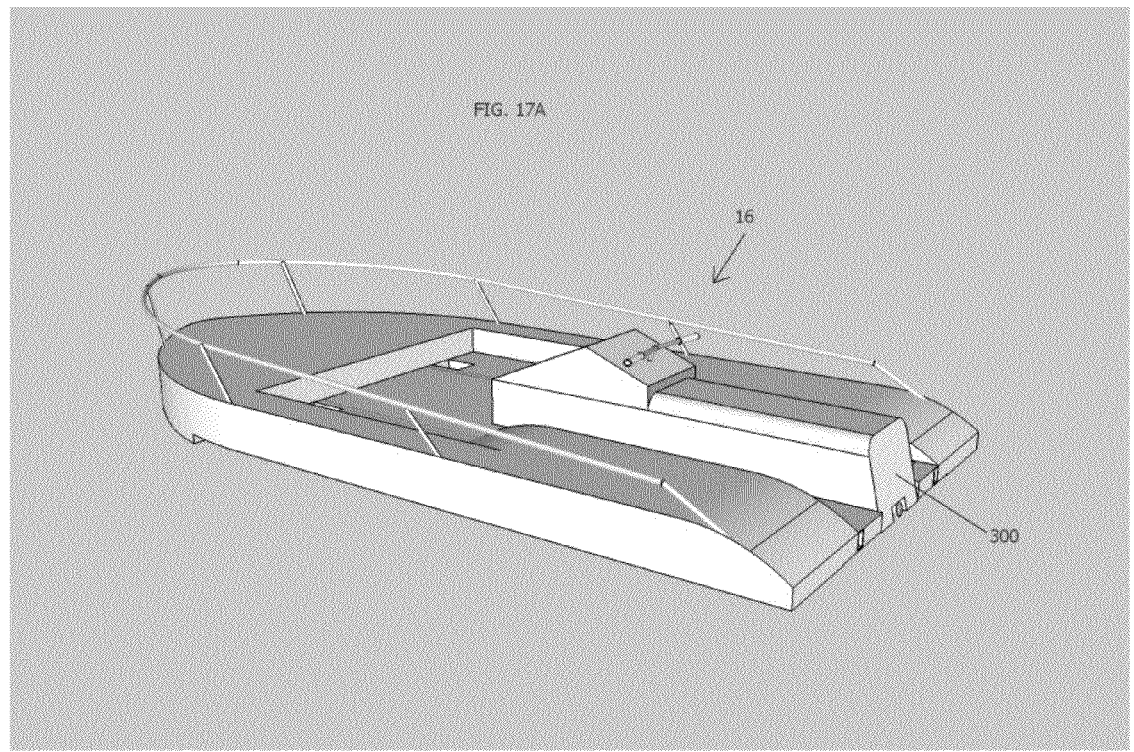

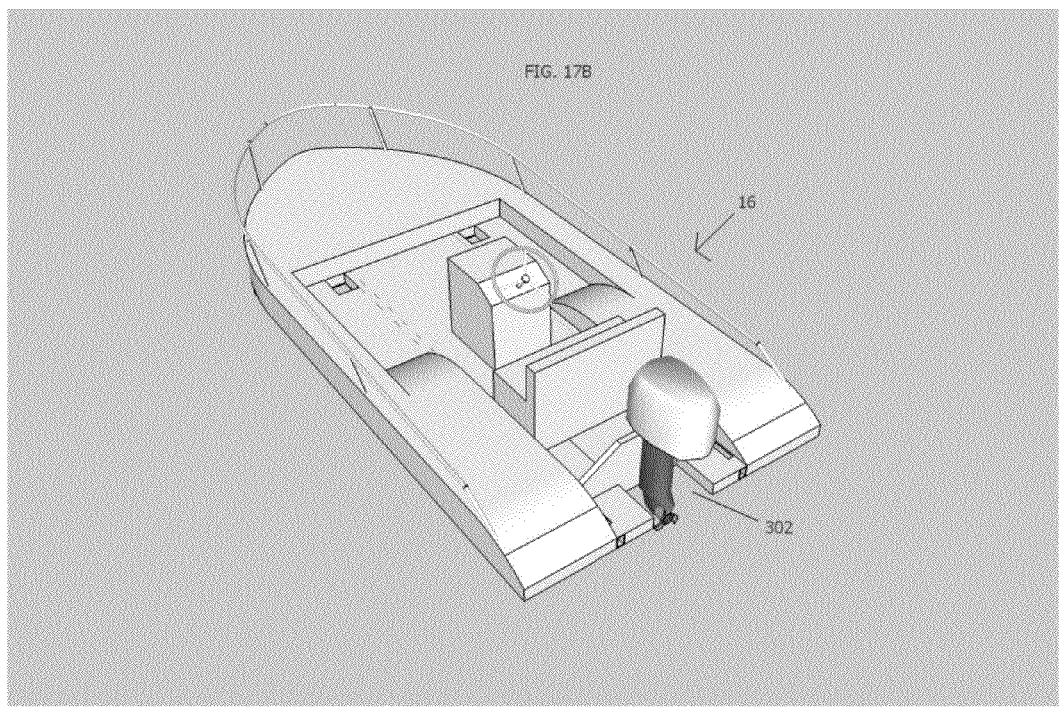

BOAT AND COMBINATION BOAT AND SNOWMOBILE

CLAIM OF PRIORITY

This application claims the benefit of priority of U.S. Provisional Patent Application Ser. No. 61/447,075, filed on Feb. 27, 2011.

FIELD OF THE INVENTION

The present invention relates to amphibious vehicles, and in particular, to an improved combination snowmobile and boat that is adapted for use in variable cold water and ice conditions such as found in water rescue operations.

BACKGROUND

In places where bodies of water at least partially freeze over during certain times of the year, there is often a need to travel across the frozen water. In some cases, this may be for emergency situations, such as where someone has fallen through the ice and must be reached for rescue. In others, it may be that one's home is on an island in the middle of a frozen lake. A snowmobile can be used to travel over solid ice, but it is rare that one can traverse a frozen body of water with complete confidence that the entire body of water is consistently solidly frozen. The rider, therefore, takes the risk that the snowmobile and rider may fall through thin ice at any time. A boat, on the other hand, may be able to move through water and break through thin ice, but will have little utility on solid ice. Therefore, there is a need for a vehicle that allows a rider to travel both over water and over solid ice.

Some progress has been made toward the development of such a vehicle and a number of patents disclose the conversion of conventional snowmobiles into aquatic vehicles. For example, U.S. Pat. No. 3,521,595 discloses the conversion of a conventional snowmobile into an aquatic vehicle for travel on water. This conversion involves the replacement of the steerable ground engaging snow skis with a buoyant supporting and steering arrangement that includes pontoons attached to the snowmobile body in the mounting arrangement coupled to the steering linkage of the snowmobile. The pontoons are disposed relative to the engine driven endless cleat track extending lengthwise under the body such that the track functions in the water as the propulsion means. Although this invention discloses the conversion of a snowmobile into an aquatic vehicle, it has significant disadvantages. First, the invention requires the removal of the snow skis in favor of pontoons. Such removal may be difficult and may make it difficult or impossible to replace the snow skis so that the snowmobile may eventually be used as an ordinary snowmobile again. Moreover, once converted, the only seating and storage space on the aquatic vehicle is on the snowmobile, which could make rescue operations difficult. Most importantly, the rudder used to steer this vehicle extends below the bottom surface of the pontoons, which prevents the vehicle from effectively travelling on snow and ice once it has been converted.

U.S. Pat. No. 4,893,692 discloses a floatable snowmobile made up of a one-piece molded plastic body. The body includes a rigid skin forming a shell defining an enclosed cavity in which there is provided an expanded closed-cell foam core of water-buoyant material. Floating skis are constructed as pontoons of similar construction to the body and replace the conventional snowmobile skis such that the whole snowmobile can float with a portion thereof out of the water so as to support a rider clear of the water in the event the snowmobile falls through ice. Although this invention also discloses a snowmobile that will not sink, it also has its disadvantages. Given its floatable construction, it is not as maneuverable as a standard snowmobile and requires significant modification in order to be converted back into a conventional snowmobile. Like the invention disclosed in U.S. Pat. No. 3,521,595, there is no seating or storage on the vehicle other than the seating and storage provided by the snowmobile, which could make rescue operations difficult. Further, and more importantly, there is no ability to effectively steer the vehicle when it is submerged in water.

Finally, U.S. Pat. No. 6,595,812 discloses an amphibious vehicle for traversing a body of water or solid terrain, such as a layer of ice floating atop a body of water. The vehicle includes a floatable boat hull having an elongate aperture therethrough, and a snowmobile for traveling over the solid terrain received in the opening and sealed in water impervious relation to the hull. The snowmobile includes an endless drive track, which supports the hull in spaced relation when travelling over solid terrain being and which rearwardly propels water to forwardly propel the vehicle through the water. A pair of skis supports the front of the hull in spaced relation with the solid terrain being traversed and each ski includes upturned forward ends mounting upstanding rudders for steering the vehicle as it traverses a body of water. The hull includes upwardly extending, downwardly opening pockets for receiving the front upturned ends of the skis and stabilizing arms, which are coupled between the frame and the skis. Upwardly inclined guides are provided on the underside of the hull for upwardly guiding the skis out of the water onto the ice floating on the water as the vehicle exits the water and moves onto the ice.

Although this vehicle has more room for storage and seating, it too has significant disadvantages. First, although the upstanding rudders allow the boat to be effectively steered once it is in water, the use of these specialized skis requires the original snowmobile skis to be removed and replaced. Second, the hard rowboat-like sides of the hull make it difficult for rescue people to lift people to be rescued into the craft, and could easily result in swamping or sinking of the vehicle. Third, the design of the bow is susceptible to a buildup of ice and snow, which could make it difficult for the craft to move up and out of the water and onto solid ice. Finally, this vehicle is solely an amphibious vehicle, which cannot be separated into a snowmobile and a boat.

Therefore there is a need for an amphibious vehicle that has sufficient seating and storage for rescue operations; that may be separated into an operational snowmobile and an operational boat; that is steerable both on ice and in water; that is designed to easily haul passengers from the water onto the vehicle; that does not require the removal and replacement of the snowmobile's skis in order for it to be effectively operated; and that has a hull that is not susceptible to ice and snow buildup.

SUMMARY OF THE INVENTION

The present invention includes a boat and a combination of a boat and a snowmobile.

In its most basic form, the present invention is a boat having a bow, an aft portion, a port side, and a starboard side. This basic form is embodied in two main versions of the present invention. The first version is described in detail below. As the second version includes many similar features to the first version, only those features that are dissimilar will be discussed in detail, and all other features should be considered to be similar to the first version.

In the first version of the present invention, a generally U-shaped inflatable tube is disposed around the port side, the bow, and the starboard side and provides buoyancy to the boat. A substantially rigid hull is attached to the inflatable tube and forms a platform upon which a snowmobile may be mounted. The hull includes a hull bow, a hull aft portion, a hull port side, and a hull starboard side. The hull bow, hull port side and hull starboard side extend at least partially under, and are attached to, the inflatable tube in a manner that prevents water from penetrating the joint formed therebetween. A snowmobile opening is disposed through the hull and includes an aft end and a midship end. A tubular aft structure is disposed at the aft of the top of the hull and a tubular bow structure is disposed between the aft and the bow of the boat on the top of the hull. The tubular aft structure and tubular bow structure are positioned and dimensioned to secure a snowmobile to the hull. Two steering pods are located on either side of the tubular bow structure at a location proximate to a location of each of the snowmobile skis. Each steering pod includes a steering pod cavity on the bottom of the hull that is formed by the steering pods. Two under-hull skis are disposed between the starboard side and the port side of the boat on the bottom of the hull and two boat ski attachment mechanisms attach the two under-hull skis to the bottom of the hull at the steering pod cavities. Two boat steering mechanisms extend through the steering pods and control the motion of the two under-hull skis. Each boat steering mechanism includes a first end in mechanical communication with one of the two boat attachment mechanisms in the steering pod cavities. Finally, two snowmobile ski attachment mechanisms attach to the second ends of the two boat steering mechanisms. The snowmobile ski attachment mechanisms are adapted to attach to the snowmobile skis such that steering of the snowmobile skis in a conventional manner causes the under-hull skis to move in a desired direction.

The inflatable tube of the first version of the present invention is preferably a durable synthetic rubber tube, such as those usually used with Hypalon-type boats. The inflatable tube preferably has three connected, but independently inflated, sections to maintain flotation even if one is compromised and each section preferably has its own inflation valve. The inflatable tube is preferably attached to the hull with cemented strips both on the top and on the bottom. A transom frame is preferably permanently attached to the inflatable tube. The inflatable tube preferably also includes lifting handles and other accessories for rescue operations cemented to it.

The hull is preferably manufactured of fiberglass and is designed to have a tunnel type shape, with the hull port and starboard sides on either side of a preferably raised area that includes the snowmobile opening. The snowmobile opening is a cutout in the hull sized and dimensioned to accept a snowmobile track. The tunnel hull design improves water flow to the snowmobile endless drive track while reducing exposure to the bottom of the hull. The tunnel hull design also allows reverse thrust from the snowmobile endless drive track, allowing the boat to move in both forward and backward directions. The hull preferably extends at least partially underneath the inflatable tube to protect the inflatable tube from rough ground and/or obstructions when the boat is not on water. The hull also preferably includes a chine that is stepped to raise the inflatable tube in order to further reduce its contact with the ground and ice.

The tubular aft structure and tubular bow structure may be made of any metal material, including rolled steel or tubular aluminum. The preferred tubular structures are made from stainless steel tubing of approximately one inch in diameter and with a 0.090 inch wall thickness. The tubular aft structure and tubular bow structure are spaced apart to allow a snowmobile to be positioned between these structures. The tubular aft structure serves as a mount for the rear of the snowmobile and the tubular bow structure serves as a mount for the front of the snowmobile and a structural brace for the steering pods. The tubular structures are preferably affixed to metal stringers embedded in the hull allowing the front and rear of a snowmobile to be rigidly mounted to the hull of the boat.

In a preferred embodiment, the tubular aft structure includes a three-sided cross section and two vertical braces. The first two sides of the three-sided cross section come up from the hull and the third side connects the first two. The first two sides include an outer sleeve so that they can telescope to different lengths within the outer sleeve. This adjustment allows for better securing of snowmobiles of different sizes; particularly snowmobiles of different heights. Once the desired height is achieved, an adjustment mechanism locks the first two sides in place. It is preferred that the adjustment mechanism for each side be a bolt that is secured through the side to secure it at the desired height. However, those of ordinary skill in the art will recognize that there are several ways of securing the adjustment mechanism other than through the use of bolts and that the present invention is not so limited. The cross section also preferably includes hinges at the bottom of the first and second sides that secure the first and second sides to the hull. These hinges allow the entire cross section to fold down, preferably off the aft of the boat, so that the cross section is flat. This folding down of the entire cross section essentially opens the aft of the boat to allow for the loading and unloading of the snowmobile. Moreover, the ability of the cross section to move fore and aft, even when not completely folded down, allows for better securing of snowmobiles of different sizes; particularly those of different lengths.

The vertical braces of the tubular aft structure intersect with the first two sides of the three-sided cross section at one end and are secured to the hull. The vertical braces are parallel to the hull starboard and port sides. The vertical braces also preferably have outer sleeves and adjustment mechanisms so that their length may also be adjusted and secured, especially to conform with the extra length necessary to allow for the cross section to be folded flat, as discussed above. Again like the first two sides of the cross section, the ends of the vertical braces that are attached to the hull are attached via hinges so that the vertical braces can fold down and/or adjust with the cross section.

It is preferred that the tubular aft structure also include a cross brace and two lateral braces for additional support for the tubular aft structure. The cross brace is preferably a brace spanning between the first and second sides of the three-sided cross section and is disposed below and parallel to the third side of the cross section. The two lateral braces extend out from the cross section coplanar with the plane of the cross section. One end of each lateral brace is attached to an outer sleeve of one of the first and second sides of the cross section. The other end of the lateral brace is attached to the hull with a hinge so that the lateral braces may fold down and/or adjust with the cross section.

In some embodiments, the tubular aft structure also serves as a transom. In the preferred embodiment, however, the boat also includes a permanent transom framework that is attached to both the hull and the inflatable tube and is independent from the aft tubular structure. In such embodiments, a center transom is preferably completed and made water-tight by a center transom insert to be installed after the snowmobile is in place. The center transom insert preferably has a rubber gasket on the bottom and both sides, and is secured in place with toggle mechanisms.

It is also preferred that the third side of the cross section of the tubular aft structure include at least one and preferably two clamp blocks and hook latches. These devices are designed to accept and secure the rear lift handle of a snowmobile to the tubular aft structure. The clamp locks are preferably bolted rigidly to the third side of the cross section and are recessed to accept the rear lift handle of the snowmobile. The hook latch is preferably either bolted into position or held by a toggle mechanism to secure the rear lift handle of the snowmobile.

It is preferred that the tubular bow structure also include at least one cross brace between the first two sides of the cross section and at least one cross brace between the vertical braces for additional support for the tubular bow structure. It is preferred that there be a first cross brace that is located below and parallel to the third side of the cross section and a second cross brace that is located below the first cross brace and diagonally spans the distance between the first two sides of the cross section. It is also preferred that there be a third cross brace that diagonally spans the distance between the two vertical braces.

In the preferred embodiment, the third side of the cross section of the tubular bow structure also includes at least one and preferably two clamp blocks and hook latches. These devices are designed to accept and secure the front lift handle of a snowmobile. The clamp locks are bolted rigidly to the third side of the cross section and are recessed to accept the front lift handle of the snowmobile. As was the case with the hook latch utilized in the preferred aft structure, the hook latch is preferably either bolted into position or held by a toggle mechanism to secure the front lift handle of the snowmobile.

The two steering pods are preferably positioned roughly on either side of the tubular bow structure and take the form of rounded protrusions from the top of the hull. These protrusions in the top of the hull create steering pod cavities in the bottom of the hull. The boat ski attachment mechanisms that attach the two under-hull skis to the bottom of the hull are disposed in the steering cavities. In the preferred embodiment, the hull also includes a bow step positioned on the bottom of the hull at the bow that protects the tips of the under-hull skis.

The boat ski attachment mechanism is preferably a springed piston attached to one or more a-arms that work with bushings to allow articulation of the under-hull ski. Although this is the preferred attachment mechanism, one of ordinary skill in the art will recognize that there are several ways in which the under-hull skis may be attached to the bottom of the hull and each of these ways is contemplated as being within the scope of the present invention. The geometry of the a-arms allows the tails of the under-hull skis to travel while keeping the tips of the under-hull skis nested behind the bow step, preventing the tips from being caught on foreign objects. The a-arms are attached to vertical cylinders, which carry kingpins in sealed bearings.

The under-hull skis are designed to ride nearly flush with the hull and cover the steering cavity to protect the boat ski attachment mechanisms and boat steering mechanisms. The under-hull skis include a perpendicular edge that extends downward and acts as a rudder when the boat is in the water and acts as a skate blade, similar to a blade on an iceboat, when the boat is on hard ice or snow.

In some embodiments, Teflon "skid blocks" or a layer of another non-stick material is disposed between the top of the each ski and the hull in order to allow the skis to easily move when in contact with the hull. Under normal load, the ski geometry and bump stops prevent the ski from contacting the hull. In conditions where the ski is raised above the surface of the water or ice, when contacting bumps or ridges, it will flex in order to direct the ski on top of the obstacle. Should this flex allow the tip or tail of the ski to contact the hull, the skid block prevents damage to both hull and ski, and facilitates steering while there is contact.

Each of the boat steering mechanisms has two ends, one of which is in mechanical communication with one of the boat ski attachment mechanisms. In the preferred embodiment, a first steering arm is the first end of the boat steering mechanism, and this mechanical communication is in the form of the first steering arm disposed at the top of one of the kingpins of one of the boat ski attachment mechanisms. The steering arm preferably includes several holes for travel adjustment. The steering arm is connected via a first shaft with spherical bearings on each end, to a second shaft with devises on each end. The second shaft travels through the hull of the steering pod and is carried in a cylinder with wiper seals on each end, thus preventing leakage. A third shaft, also with spherical bearings on each end, is attached to the second shaft. The third shaft is connected to a second steering arm. In the preferred embodiment of the boat steering mechanism, the second end of the boat steering mechanism that is disposed on the top of the hull is this second steering arm. The second end of the boat steering mechanism, which is preferably the second arm, may be affixed to a snow ski of a snowmobile through a snowmobile ski attachment mechanism and aligned with the pivot point.

The snowmobile ski attachment mechanism is preferably either a saddle with toggle clamps or a clevis that attaches directly to the base of the snowmobile kingpin if the snow ski of the snowmobile is removed. If a snow ski of a snowmobile is so attached to the boat steering mechanism through the snowmobile ski attachment mechanisms, then the under-hull skis of the boat will move as directed by a snowmobile steering mechanism that controls the movement of the snow skis of the snowmobile. Although the boat steering mechanism described herein is the preferred embodiment, one of ordinary skill in the art will recognize that there are several ways in which a boat steering mechanism that spans between the under-hull skis of the boat to connect with the snow skis of the snowmobile may be arranged so as to use the steering of the snowmobile as the steering of the boat, and each of these ways is contemplated as being within the scope of the present invention. Further, in some embodiments, the skis of the snowmobile may be removed and the boat steering mechanism may be adapted to connect directly to the snowmobile steering mechanism. The function of the shaft assembly may also be achieved with a cable assembly, for example. The steering mechanism may also be attached via cable to a pivoting rudder at the rear of the boat, enhancing maneuverability in the water. When on solid ground, traveling both in forward and reverse, the rudder pivots up and simply rides on the surface.

In some embodiments, the boat of the present invention includes an insert so that the boat is seaworthy on its own. The insert preferably includes a backboard, a motor, a floor, a seat, and a console with a steering wheel and a throttle. The backboard covers the aft of the boat. The motor is positioned on the backboard. The floor covers the snowmobile opening. The seat is for the comfort of the driver. The console preferably includes boat controls, such as a steering wheel and throttle.

The second version of the present invention differs from the first version in six main respects: First, the second version of the boat of the present invention does not include an inflatable tube, and does include a railing. Second, the second version of the boat of the present invention does not include a tubular bow structure, and instead includes a hull recess designed to accept a snowmobile. Third, the second version of the boat of the present invention also does not include a tubular aft structure, and instead includes a hydraulic cylinder and mounting bar system. Fourth, the second version of the boat of the present invention has different boat ski attachment mechanisms, boat steering mechanisms, and snowmobile ski attachment mechanisms. Fifth, the second version of the boat of the present invention includes thrust plates at the boat's aft. Sixth, the second version of the boat of the present invention has a modified transom. These differences are detailed below.

The railing of the second version of the present invention preferably extends around three sides of the boat, excluding the aft.

A snowmobile disposed on top of the second version of the boat of the present invention will not be stopped at the tubular bow structure, as with the first version. Instead, an entire portion of the boat, from midship to aft is recessed so as to accept the snowmobile. The hull recess includes a hull step. The snowmobile opening, ski saddles, hydraulic cylinders with frame and arms, and aspects of the boat steering mechanism, which will be discussed in more detail below, are all included within the hull recess. The hull recess allows the snowmobile to be located very low in the hull, extending the snowmobile track as far as possible below the bottom of the hull. This maximizes track contact with the snow.

Like the first version of the boat of the present invention, however, the second version of the boat may include an outboard insert at its aft to make the boat seaworthy for summer use when the boat is not being used in concert with a snowmobile. The outboard insert may include a transom. The insert may also be a jet drive. When the second version of the boat of the present invention is in summer use as a boat only, the lifting arms of the mounting bar, although not the nested hydraulics cylinders, the thrust plates, and the boat steering mechanism are removed, and an insert is inserted.

As discussed above, the tubular aft structure is also absent in the second version of the present invention. The back of the snowmobile is held in place by a mounting bar and a transom. The preferred mounting bar includes hydraulic cylinders, lifting arms, and support arm. The lifting arms extend on three sides to connect the hydraulic cylinders on either side of the snowmobile opening. The mounting bar is designed according the individual snowmobile being mounted onto the boat. The hydraulic cylinders retract to keep the mounting bar flat during mounting of the snowmobile and extend to raise the mounting bar while the snowmobile is mounted on the boat. The preferred second version of the boat of the present invention includes a different snowmobile attachment mechanism. The preferred snowmobile ski attachment mechanism of the second version includes ski saddles disposed within the hull recess on the top of the boat. The ski saddles each include a clamp mechanism that affixes the ski to the ski saddles. The ski saddles ride via a sealed bearing on a movable mounting plate attached to the floor of the hull recess. The bearings allow the ski saddles, and therefore the snowmobile skis, to pivot. The preferred second version of the boat of the present invention also includes a slightly different boat ski attachment mechanism. The preferred boat ski attachment mechanism includes a-arms, vertical cylinders, kingpins, boot seals, and bushings. The under-hull skis are secured to the sides of aluminum steering pods, which are integral to the hull through a-arms and bushings, allowing articulation of the under-hull ski. In the second version of the boat of the present invention, the steering pods are not visible above the surface of the hull, as they are in the first version. The geometry of the a-arms allows the tails of the under-hull skis to travel while keeping the tips of the under-hull skis nested behind the bow step, preventing them from being caught on foreign objects. The a-arms are attached to vertical cylinders, which carry kingpins in sealed bearings. The kingpins are sealed to the hull with boot seals. The a-arm assemblies may be dampened with urethane bushings attached to the lower a-arms and the upper portion of the steering pods. Dampening may also be accomplished with conventional coil-over springs or shock absorbers, or with torsion bars.

The preferred second version of the boat of the present invention also includes a slightly different boat steering mechanism, which links the boat ski attachment mechanism and the snowmobile attachment mechanism. The preferred snowmobile ski attachment mechanism includes first and second steering arms, bearings, a shaft, a steering link, and a rudder. The first steering arm is disposed at the top of the kingpin of the boat ski attachment mechanism. The second steering arm is integral to the ski saddle of the snowmobile ski attachment mechanism. Both the first and second steering arms include several holes for travel adjustment. The first and second steering arms are connected via the shaft with spherical bearings on each end where they are attached to the kingpin and ski saddle, respectively. The steering link connects the second steering arm and the rudder. The rudder pivots up on hard surfaces and drops in the water for added directional control. The rudder is located at the aft of the boat.

The second version of the boat of the present invention includes thrust plates. The thrust plates are positioned in the aft end of the snowmobile opening. The thrust plates provide lateral rigidity and direct water thrust by the snowmobile track, both backward and downward.

Finally, the second version of the boat of the present invention includes a different transom from the first version. The transom includes a removable transom rail that gives the hull torsional rigidity while also serving as a conventional rail. Not all embodiments of the second version of the boat include a transom.

In its most basic form, the combination of the present invention includes the boat of the present invention, as described above, and a snowmobile. The snowmobile includes a chassis with a front and a rear, an engine, an endless driving track in mechanical and electrical communication with the engine, two snow skis attached to the front of the chassis, and at least one snowmobile steering mechanism maneuverable to control the motion of the two snow skis, in mechanical communication with the engine. The snowmobile chassis is disposed on the top of the boat hull between the tubular bow structure and the tubular aft structure, with the front of the chassis next to the tubular bow structure and the rear of the chassis next to the tubular aft structure. The endless drive track of the snowmobile is disposed within the snowmobile opening of the boat and the two snowmobile ski attachment mechanisms of the boat are attached to the two snow skis of the snowmobile such that when the snowmobile steering mechanism is maneuvered, the boat steering mechanism is similarly maneuvered.

To load the snowmobile onto the preferred embodiment of the first version of the boat, the center transom insert is removed and the tubular aft structure is folded all the way down. The front of the chassis of the snowmobile is then positioned against the tubular bow structure, the tubular aft structure is folded back up, and the center transom insert is fitted back into place. The tubular bow structure may be adjusted for the height of the snowmobile as described above. In preferred embodiments of the tubular bow structure and tubular aft structure that include at least one clamp block and hook latch, and preferred embodiments of the snowmobile that include front and rear lift handles, the front lift handle may be accepted and secured onto the tubular bow structure through the clamp blocks and hook latches and the rear lift handle may be accepted and secured onto the tubular aft structure, as discussed above. The tubular aft structure may be adjusted for height, and may also be adjusted fore and aft as necessary to accommodate the height and length of the snowmobile and to ensure that the snowmobile is positioned such the endless drive track of the snowmobile passes through the snowmobile opening through the hull of the boat.

As discussed above, when the snowmobile ski attachment mechanisms of the boat are attached to the snow skis of the snowmobile, the snowmobile steering mechanisms become connected with the boat steering mechanism so that maneuvering the snow skis of the snowmobile with the snowmobile steering mechanisms also maneuvers the under-hull skis of the boat through the boat steering mechanism. In embodiments where the snowmobile skis are removed, the boat steering mechanism attaches to the snowmobile steering mechanism and functions in a similar manner. In such embodiments, the removal of the snowmobile skis allows the boat to have a narrower hull, which is advantageous in some circumstances.

To load the snowmobile onto the preferred embodiment of the second version of the boat, the mounting bar is lowered flat, the thrust plates are retracted, and the snowmobile is moved into position within the recessed area in the hull of the boat. In position, the snowmobile skis are secured within the ski saddles. In this position, steering the snowmobile will also steer the boat through the boat steering mechanism. The mounting bar and thrust plates are raised to support and manipulate the back of the snowmobile.

Therefore it is an aspect of the present invention to provide a combination snowmobile and boat vehicle.

It is a further aspect of the present invention to provide a combination snowmobile and boat vehicle that has sufficient seating and storage for rescue operations.

It is a further aspect of the present invention to provide a combination snowmobile and boat vehicle that may be separated into an operational snowmobile and an operational boat.

It is a further aspect of the present invention to provide a combination snowmobile and boat vehicle that uses the steering mechanism of the snowmobile to steer the boat.

It is a further aspect of the present invention to provide a combination snowmobile and boat vehicle that does not require the skis of the snowmobile to be removed and/or replaced.

It is a further aspect of the present invention to provide a combination snowmobile and boat vehicle that is designed to easily haul passengers from the water onto the vehicle.

It is a further aspect of the present invention to provide a combination snowmobile and boat vehicle that has a hull that is not susceptible to ice and snow buildup These aspects of the present invention are not meant to be exclusive and other features, aspects, and advantages of the present invention will be readily apparent to those of ordinary skill in the art when read in conjunction with the following description, claims, and accompanying drawings.

BRIEF DESCRIPTION OF THE DRAWINGS

FIG. 10B is a perspective view of an alternate embodiment of the top of the boat of the second version of the present invention.

FIG. 10C is a perspective view of an alternate embodiment of the top of the boat of the second version of the present invention.

FIG. 12A is an isolated perspective view of the thrust plates of the boat of the second version of the present invention in engaged position.

FIG. 12B is an isolated perspective view of the thrust plates of the boat of the second version of the present invention in unengaged position.

FIG. 13A is an isolated perspective view of the mounting bar of the boat of the second version of the present invention in engaged position.

FIG. 13B is an isolated perspective view of the mounting bar of the boat of the second version of the present invention in unengaged position.

FIG. 14A is an isolated perspective view of the mounting bar and thrust plates of the second version of the present invention in engaged position.

FIG. 14B is an isolated perspective view of the mounting bar and thrust plates of the second version of the present invention in unengaged position.

FIG. 15B is an exploded perspective view of an alternate embodiment of the steering mechanism of the combination of the second version of the present invention.

FIG. 16A is a perspective view of the boat of the second version of the present invention in engaged position.

FIG. 16B is a perspective view of the boat of the second version of the present invention in unengaged position.

FIG. 17A is a perspective view of the boat of the second version of the present invention being used as a boat only with a jet drive insert.

FIG. 17B is a perspective view of the boat of the second version of the present invention being used as a boat only with an outboard insert.

DETAILED DESCRIPTION

Figure 1A:
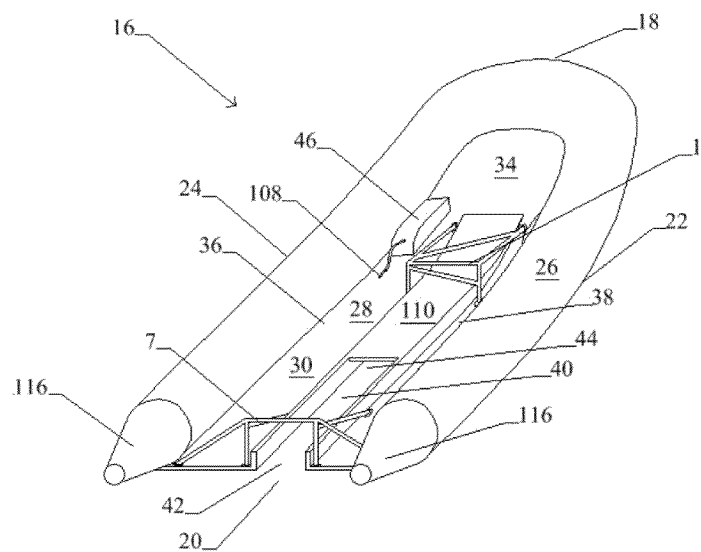
FIG. 1A is a perspective view of the top of the boat of the first version of the present invention.
Figure 1B:
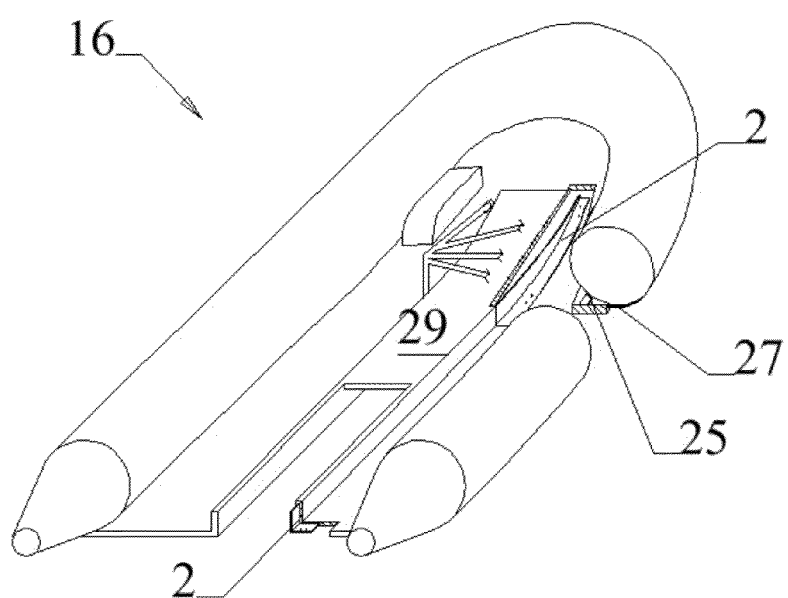
FIG. 1B is a perspective cut away view of the top of the boat of the first version of the present invention.
Figure 2:
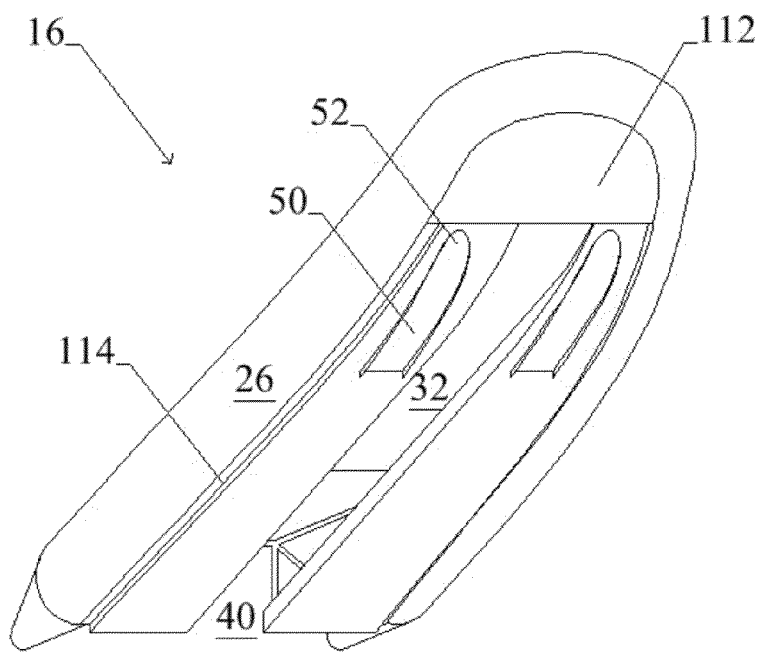
FIG. 2 is a perspective view of the bottom of the boat of the first version of the present invention.

Throughout the figures, common reference numbers refer to common features of the present invention. Referring first to FIGS. 1A, 1B, and 2, the preferred embodiment of the boat 16 of the present invention is shown.

FIG. 1A shows the top of the first version of boat 16, which includes bow 18, aft 20, starboard side 22, and port side 24. U-shaped inflatable tube 26 extends around the bow 18, starboard side 22 and port side 24 and terminates in ends 116. Hull 28 has a top 30, which includes raised area 110, a hull bow 34, hull port side 36, and hull starboard side 38. Snowmobile opening 40 is disposed through the raised area 110 in the top 30 of the hull 28 and includes aft end 42 and midship end 44. Steering pod 46 extends upward from the top 30 of the hull 28 and the second end 108 of boat steering mechanism 104 is shown extending therefrom. Tubular bow structure 1 is shown extending from the top 30 of the hull 28 proximate to the hull bow 34 and tubular aft structure 7 is shown extending from the top 30 of the hull 28 proximate to the aft of the boat 16.

FIG. 1B shows the top of the first version of boat 16 with a cutaway portion that reveals the top cemented strips 25 and bottom cemented strips 27 that attach inflatable tube 26 to hull 28. The preferred hull 28 is made of fiberglass 29 and is reinforced with metal stringers 2. As discussed below with reference to FIGS. 3A and 4, tubular aft structure 7 and tubular bow structure 1 are affixed to hull 28 at sections of hull 28 that are reinforced with metal stringers 2, as shown in FIG. 1B.

Figure 5:
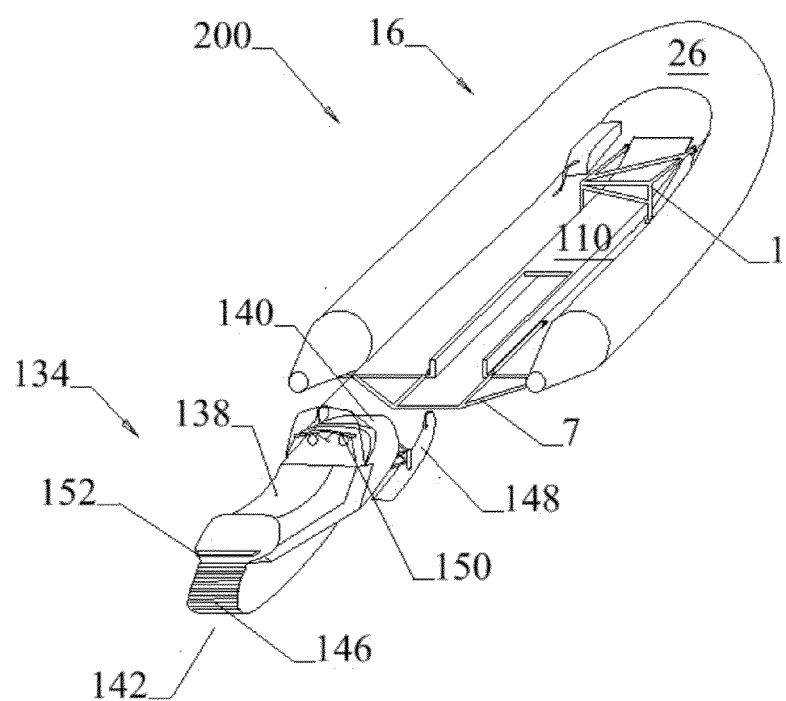
FIG. 5 is a perspective view of the boat of the first version of the present invention prepared to receive a snowmobile of the present invention.
Figure 6:
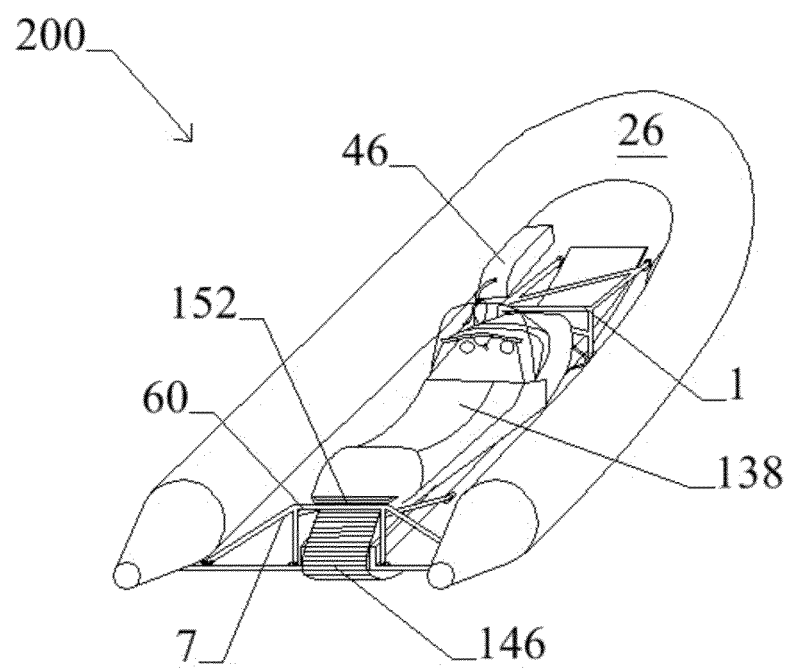
FIG. 6 is a perspective view of the combination of the first version of the present invention.

FIG. 2 shows the bottom of the first version of boat 16, which includes under-hull skis 50 with tips 52, the bottom 32 of hull 28, bow step 112, and chine 114. When the boat 16 is combined with a snowmobile, such as is shown in FIGS. 5 and 6, snowmobile 134 is mounted between tubular bow structure 1 and tubular aft structure 7 with endless drive track 146 positioned in snowmobile opening 40. In such embodiments, boat steering mechanism 104 is connected to snowmobile steering mechanism 150 through steering pods 46. This arrangement is discussed in more detail below with reference to FIGS. 5 and 7. The design of hull 28 provides for raised area 110, creating a tunnel that improves water flow to endless drive track 146 while reducing exposure of bottom 32 of hull 28. Bow step 112 protects tips 52 of under-hull skis 50 from encountering obstructions. Chine 114 is stepped to raise u-shaped inflatable tube 26 to reduce its contact with the ground and ice.

Figure 3A:
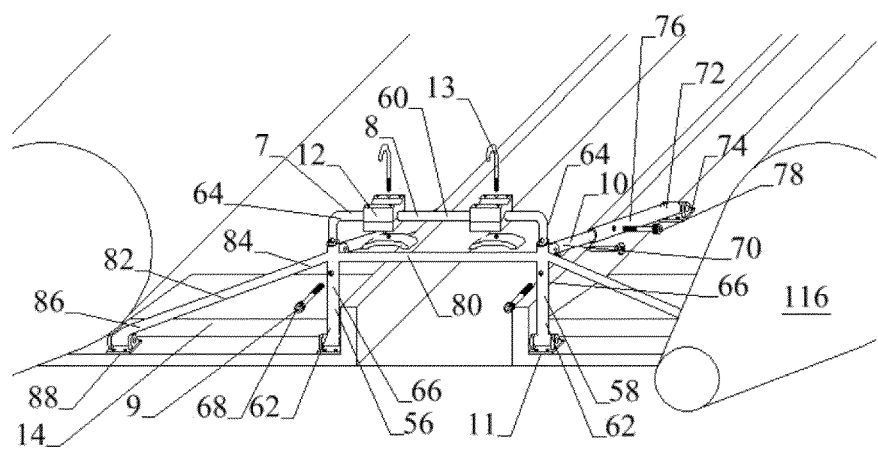
FIG. 3A is an exploded perspective view of the tubular aft structure of the boat of the first version of the present invention.
Figure 4:
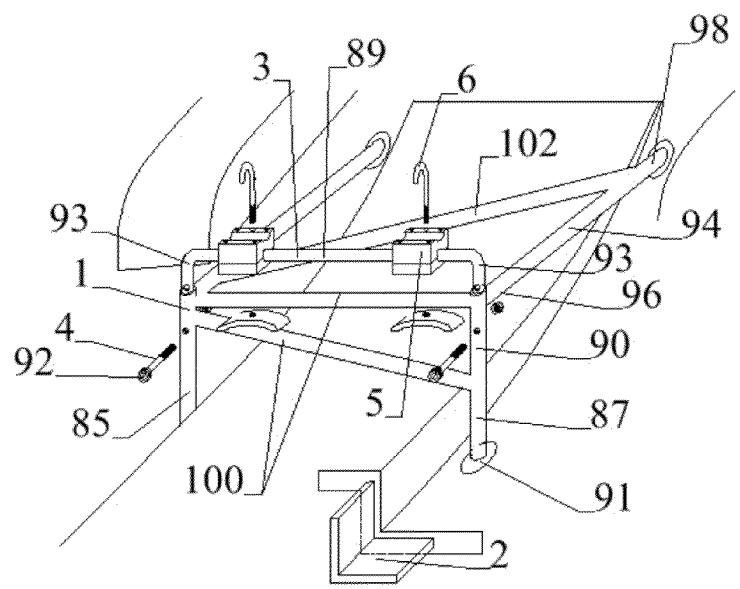
FIG. 4 is an exploded perspective view of the tubular bow structure of the boat of the first version of the present invention.

Now referring to FIG. 3A, tubular aft structure 7 of the first version of boat 16 is shown. Tubular aft structure 7 is affixed to metal stringers 2, as shown in FIGS. 1B and 4. Tubular aft structure 7 includes cross section 8, two vertical braces 10, cross brace 80, and lateral braces 82. Cross section 8 has first side 56, second side 58, and third side 60. First side 56 and second side 58 have first ends 62 that connect with hull 28 at hinge 11, which allows cross section 8 to fold entirely down, as well as to make minor adjustments fore and aft to accommodate snowmobiles 134 of different lengths. First side 56 and second side 58 include outer sleeves 66 and adjustment mechanisms 68. Adjustment mechanisms 68 are preferably bolts 9. Outer sleeves 66 and adjustment mechanisms 68 allow the lengths of first side 56 and second side 58 to be adjusted and secured. Third side 60 spans between second ends 64 of first side 56 and second side 58. Third side 60 includes clamp blocks 12 and hook latches 13. Clamp blocks 12 and hook latches 13 secure rear lift handle 152 of snowmobile 134.

Vertical braces 10 extend fore from cross section 8, with first ends 70 of vertical braces 10 meeting outer sleeves 66 of first side 56 and second side 58 of cross section 8. Second ends 72 of vertical braces 10 connect with hull 28 at hinges 74. Vertical braces 10 also include outer sleeves 76 and adjustment mechanisms 78 similar to outer sleeves 66 and adjustment mechanisms 68 of cross section 8. Hinges 74, outer sleeves 76, and adjustment mechanisms 78 allow vertical braces 10 to move with cross section 8 as cross section 8 is adjusted fore or aft and/or folded down.

Cross brace 80 spans between first side 56 and second side 58 of cross section 8. Lateral braces 82 extend from cross section 8 coplanar with the plane of cross section 8. First ends 84 of lateral braces 82 are attached to outer sleeve 66 of first side 56 and second side 58 of cross section 8. Second ends 86 of lateral braces 82 are connected to hull 28 at hinges 88. Hinges 88 allow lateral braces 82 to move with cross section 8 as cross section 8 is adjusted fore or aft and/or folded down.

The rearmost section of hull 28 is ramped 14 to the stern of tubular aft structure 7 to aid in unloading snowmobile 134 and to serve as a well while water escapes through scuppers in the transom, which is a panel bolted to the rearmost portion of tubular aft structure 7 (not shown).

Figure 3B:
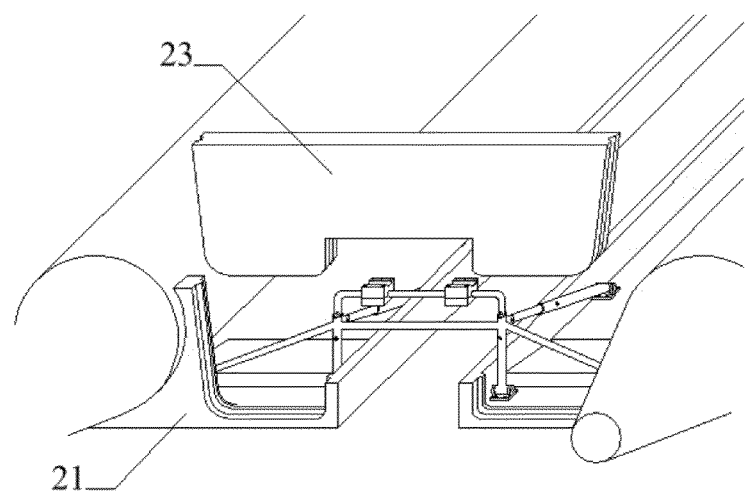
FIG. 3B is an exploded perspective view of the tubular aft structure, center transom, and center transom insert of the boat of the first version present invention.

Now referring to FIG. 3B, the preferred embodiment of the first version of boat 16 is shown, which includes tubular aft structure 7, as well as center transom 21 and center transom insert 23. Center transom 21 and center transom insert 23 essentially seal boat 16 once snowmobile 134 has been mounted on boat 16. Center transom 21 is attached to both hull 28 and u-shaped inflatable tube 26. Center transom 21 is independent from aft tubular structure 7. Center transom is completed and made water-tight by center transom insert 23, which is installed after snowmobile 134 is in place. Center transom insert 23 has a rubber gasket on the bottom and both sides, and is secured in place with toggle mechanisms. When snowmobile 134 is being mounted on boat 16, center transom insert 23 is removed and replaced once snowmobile 134 is mounted.

Now referring to FIG. 4, tubular bow structure 1 of the first version of boat 16 is shown. Tubular bow structure 1 is affixed to metal stringers 2. Tubular bow structure 1 includes cross section 3, two vertical braces 94, and cross braces 100, 102. Cross section 3 has first side 85, second side 87, and third side 89. First side 85 and second side 87 have first ends 91 that connect with hull 28. First side 85 and second side 87 include outer sleeves 90 and adjustment mechanisms 92. Adjustment mechanisms 92 are preferably bolts 4. Outer sleeves 90 and adjustment mechanisms 92 allow the lengths of first side 85 and second side 87 to be adjusted and secured. Third side 89 spans between second ends 93 of first side 85 and second side 87. Third side 89 includes clamp blocks 5 and hook latches 6. Clamp blocks 5 and hook latches 6 secure front lift handle 154 of snowmobile 134.

Vertical braces 94 extend fore from cross section 3, with first ends 96 of vertical braces 94 meeting outer sleeves 90 of first side 85 and second side 87 of cross section 3. Second ends 98 of vertical braces 94 connect with hull 28. Cross braces 100 span between first side 85 and second side 87 of cross section 3. Cross brace 102 spans between vertical braces 94.

Now referring to FIG. 5, combination 200 of the present invention is shown, including snowmobile 134 about to be loaded onto the first version of boat 16. Tubular aft structure 7 is folded flat for loading snowmobile 134 onto boat 16. Snowmobile 134 includes chassis 138 with front 140 and rear 142, endless drive track 146, snow skis 148, snowmobile steering mechanism 150, rear lift handle 152, front lift handle 154 (not shown, but understood to be disposed on front 140 of chassis 138, roughly opposite from rear lift handle 152), and engine 144 (not shown, but understood to be disposed within chassis 138). Although snowmobile steering mechanism 150 indicates the handles of snowmobile 134, it is understood that snowmobile steering mechanism 150 includes other parts that are not visible in FIG. 5, and connect the motion of the handles with the motion of snow skis 148.

Now referring to FIG. 6, combination 200 is shown with snowmobile 134 loaded on the first version of boat 16. Tubular aft structure 7 has been folded up again to secure rear 142 of chassis 138. Although clamp blocks 12 and hook latches 13 are not included in this embodiment of tubular aft structure 7, it is visible that rear lift handle 152 is positioned proximate to third side 60 of cross section 8 where clamp blocks 12 and hook latches 13 would accept and secure rear lift handle 152 in a preferred embodiment. Although not apparent in FIG. 6, snowmobile ski attachment mechanism 136 has been attached to snow skis 148 so that snowmobile steering mechanism 150 and boat steering mechanism 104 are connected, as discussed in more detail below with reference to FIG. 7.

Figure 7:
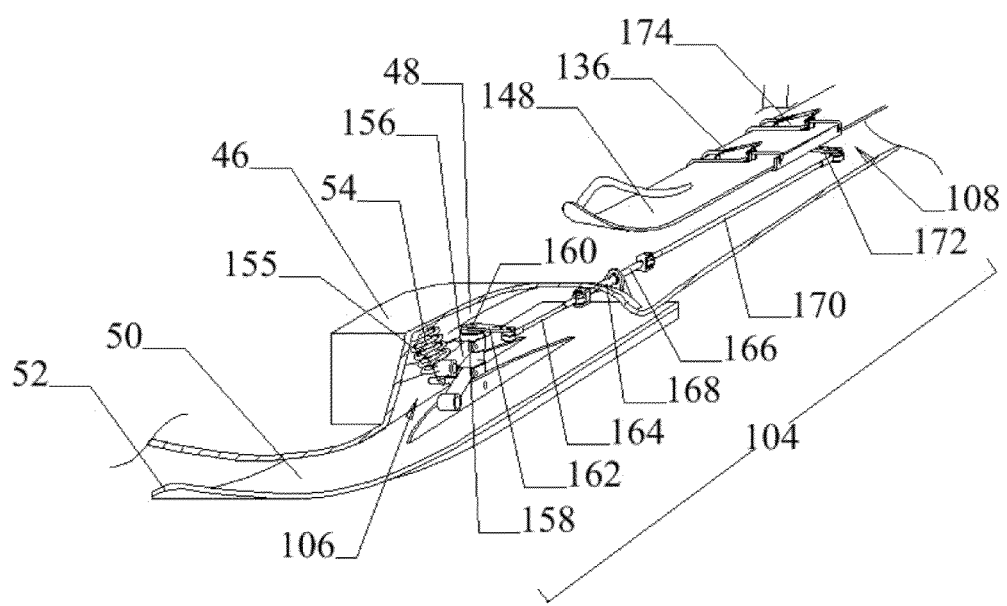
FIG. 7 is an exploded perspective view of the steering mechanism of the combination of the first version of the present invention.

Now referring to FIG. 7, the connection between under-hull skis 50 of boat 16 and snow skis 148 of snowmobile 134 that allows steering of snowmobile 134 to steer the first version of boat 16 is shown. In FIG. 7, we see steering pod cavity 48 formed by steering pod 46. Boat steering mechanisms 104 have first end 106, which is in mechanical communication with boat ski attachment mechanism 54, and second end 108, which is attached to a snowmobile ski attachment mechanism 136. Boat ski attachment mechanism 54 includes springed piston 155, attached to one of a-arms 156 that work with bushings to allow articulation of under-hull ski 50. A-arms 156 are attached to vertical cylinders 158, which carry kingpins 160 in sealed bearings.

Figure 8A:
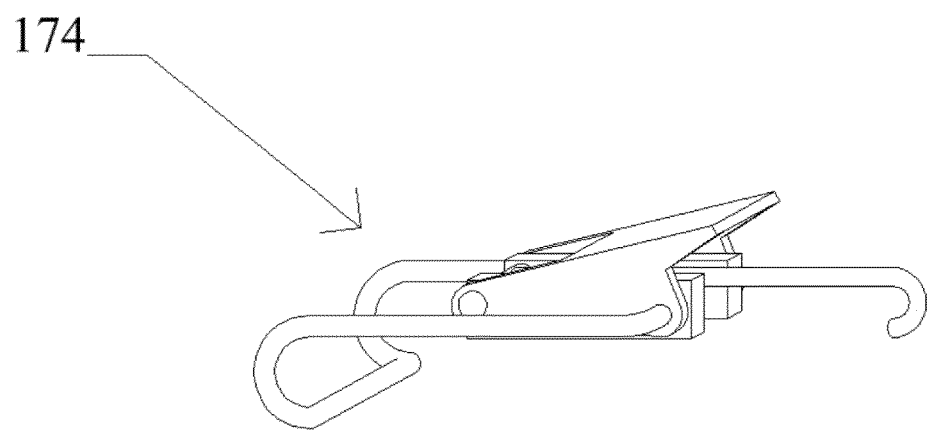
FIG. 8A is an isolated perspective view of an embodiment of the snowmobile ski attachment mechanism of the boat of the present invention.
Figure 8B:
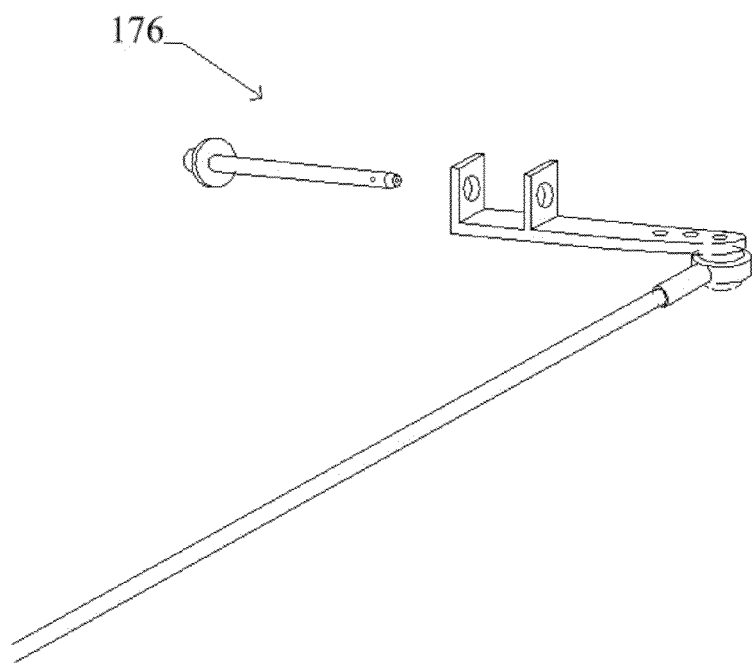
FIG. 8B is an isolated perspective view of an alternative embodiment of the snowmobile ski attachment mechanism of the boat of the present invention.

The mechanical communication between first end 106 and boat ski attachment mechanism 54 is in the form of first steering arm 162 disposed at the top of kingpin 160. First steering arm 162 is first end 106 of boat steering mechanism 104. First steering arm 162 includes several holes for travel adjustment. First steering arm 162 is connected via first shaft 164 with a spherical bearing on each end, to second shaft 166 with devises on each end. Second shaft 166 travels through hull 28 of steering pod 46 and is carried in cylinder 168 with wiper seals on each end, thus preventing leakage. Third shaft 170, also with spherical bearings on each end, is attached to second shaft 166. Third shaft 170 is connected to second steering arm 172. Second steering arm 172 is second end 108 of boat steering mechanism 104. Second steering arm 172 is affixed to snow ski 148 through snowmobile ski attachment mechanism 136 and aligned with the pivot point. As shown in FIG. 7, snowmobile ski attachment mechanism 136 is a saddle with toggles 174, also shown isolated in FIG. 8A. In some embodiments, where snow ski 148 is removed, snowmobile attachment mechanism 136 is clevis 176, as shown isolated in FIG. 8B. In such embodiments, clevis 176 is attached directly to the base of a snowmobile kingpin. When snow ski 148 of snowmobile 134 is attached as shown in FIG. 7 to boat steering mechanism 104 through snowmobile ski attachment mechanism 136, under-hull skis 50 of boat 16 will move as directed by snowmobile steering mechanism 150 that controls the movement of snow skis 148 of snowmobile 134. Although FIG. 7 shows only one side of combination 200, it is understood that the other side is similarly connected.

Figure 9:
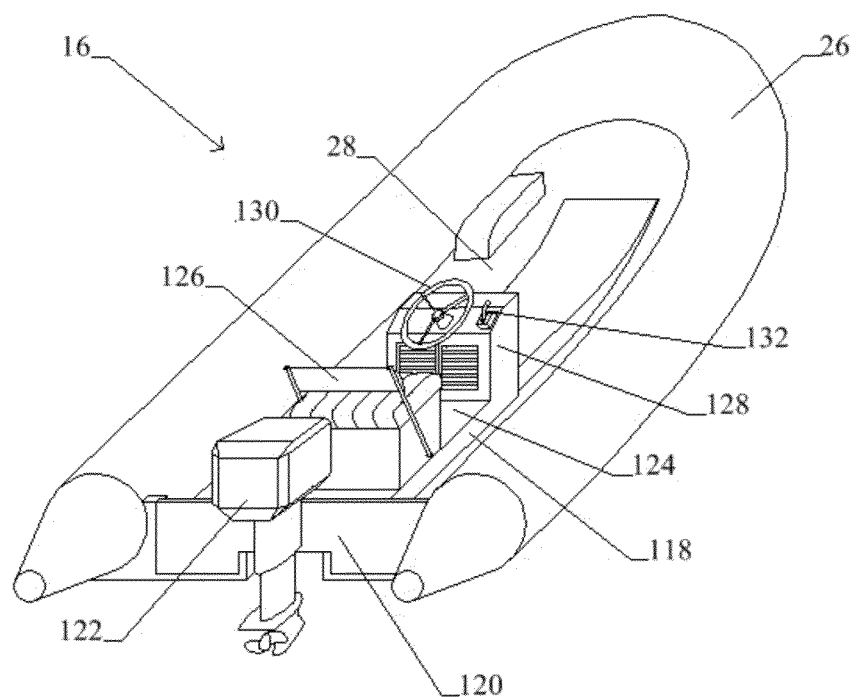
FIG. 9 is a perspective view of a boat of the first version of the present invention with an insert.

Now referring to FIG. 9, the first version of boat 16 is shown with insert 118. Boat 16 with insert 118 may act alone as a seaworthy boat. Insert 118 includes backboard 120, motor 122, floor 124, seat 126, and console 128 with steering wheel 130 and throttle 132. Backboard 120 covers aft 20 of boat 16. Motor 122 is positioned on backboard 120. Floor 124 covers snowmobile opening 40. Seat 126 is for the comfort of the driver. Console 128 includes boat controls, such as steering wheel 130 and throttle 132.

Figure 10A:
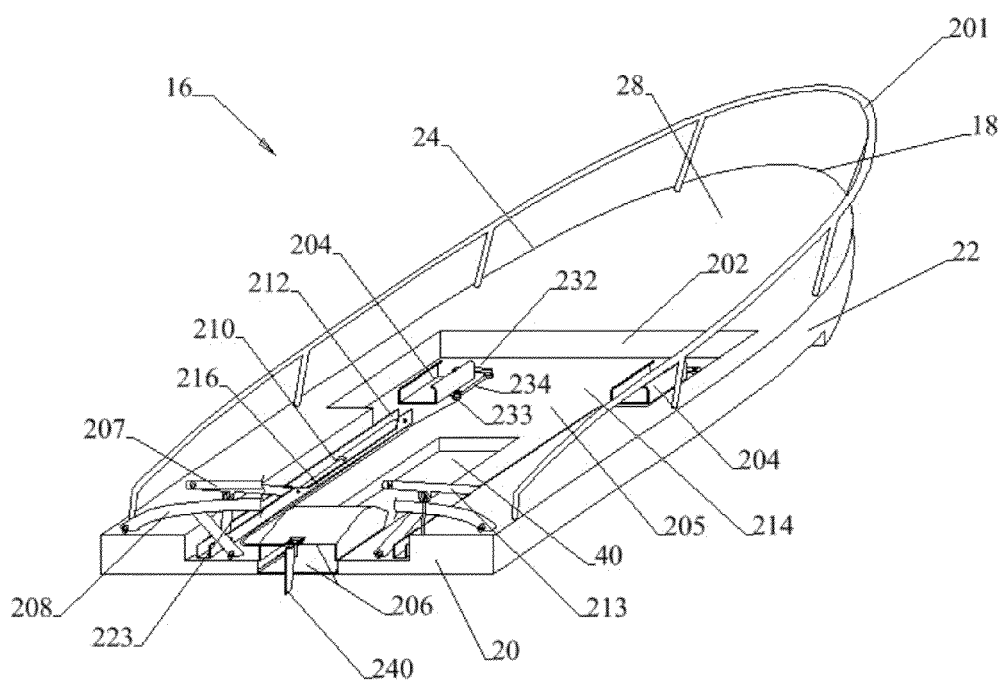
FIG. 10A is a perspective view of the top of the boat of the second version of the present invention.

Now referring to FIGS. 10A-10C, various embodiments of the second version of boat 16 is shown. FIG. 10A shows all of the features of boat 16. FIGS. 10B and 10C focus on the basic shape features of boat 16, and omit some features shown in FIG. 10A. These omissions do not indicate a lack of necessity of the features shown in FIG. 10A, and omitted from FIGS. 10B and 10C. Boat 16 includes rail 201 surrounding three sides of boat 16, and hull recess 214, which is a recessed area down hull step 202 within hull 28 extending from approximately mid-ship to aft. Hull recess 214 allows snowmobile 134 to be located very low in hull 28, extending snowmobile track 146 as far as possible below hull bottom 32. This maximizes track contact with the snow. Ski saddles 204 are disposed toward the mid-ship end of hull recess 214. Ski saddles 204 are attached to second steering arms 233, which are connected to first steering arms 232 by shaft 234. Second steering arms 233 are also attached to rudder 240 by steering link 216. As detailed in FIG. 15A and 15B, first steering arms 232 are integral to boat ski attachment mechanism 54 so that first steering arms 232 relay the motion of snow skis 148 of snowmobile 134, held in ski saddles 204, to under-hull skis 50. Similarly, second steering arms 233 relay the motion of snow skis 148 to rudder 240 through steering link 216.

Hull recess 214 also includes snowmobile opening 40. In this second version of boat 16, snowmobile opening includes thrust plates 206 toward aft end 42 of snowmobile opening 40. Thrust plates 206 provide lateral rigidity and direct water thrust by snowmobile track 146 both backward and downward. Aft portion 20 of boat 16 also includes removable transom rail 208, which gives hull 28 torsional rigidity while also serving as a conventional rail for safety. Not all embodiments of boat 16 include transom rail 208.

Finally, hydraulic cylinders 210 are also disposed within hull recess 214. Hydraulic cylinders 210 are housed within frame 212 affixed to hull recess floor 203. Hydraulic cylinders 210 are part of mounting bar 207. Mounting bar 207 includes hydraulic cylinders 210, lifting arms 213, and support arm 223. Although cut away in FIG. 10A, lifting arms 213 extend on three sides to connect hydraulic cylinders 210 on either side of snowmobile opening 40. Mounting bars 207 are designed according the individual snowmobile 134 mounted onto boat 16. Hydraulic cylinder 210 retract to keep mounting bar 207 flat during mounting of snowmobile 134 and extend to raise mounting bar 207 while snowmobile 134 is mounted on boat 16. While boat 16 is being used as a boat only in the summer without snowmobile 134, lifting arms 213, but not hydraulic cylinders 210 or support arms 223 are removed, along with thrust plates 206 and boat steering mechanism 104.

Figure 11:
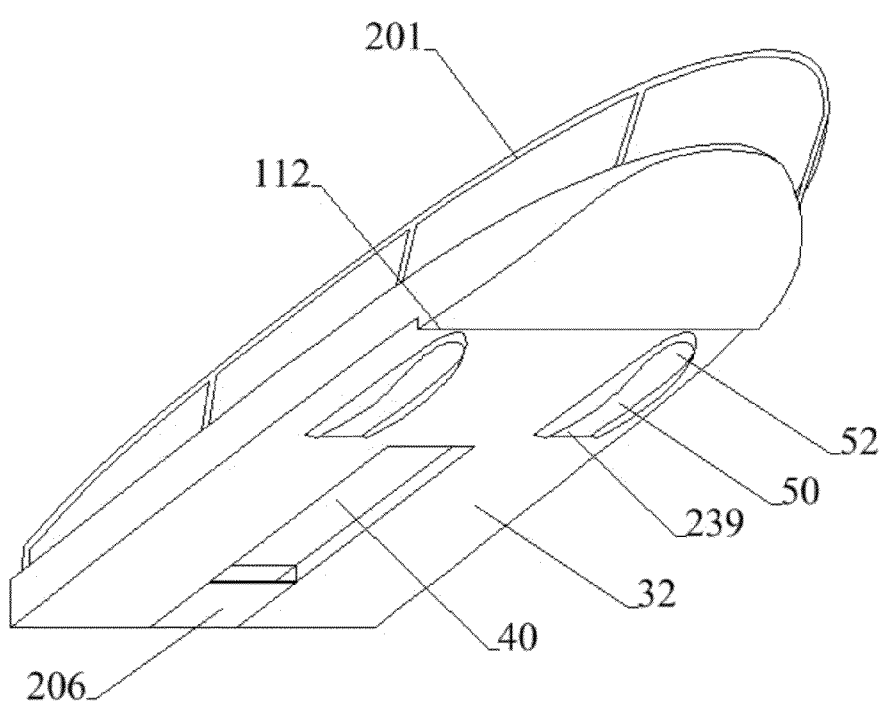
FIG. 11 is a perspective view of the bottom of the boat of the second version of the present invention.

Now referring to FIG. 11, a perspective view of the bottom of the second version of boat 16 of the present version is shown. As in FIG. 2, which shows the bottom of the first version of boat 16, hull bottom 32 includes bow step 112 to shield tips 52 of under-hull skis 50. Tails 239 of under-hull skis 50 are also identified. Unlike FIG. 2, the second version of boat 16 does not include inflatable tube 26, and does include rail 201 and thrust plates 206.

Now referring to FIGS. 12A and 12B, thrust plates 206 are shown in engaged and unengaged positions, respectively. For all features of boat 16, "unengaged position" is the position the feature is in as snowmobile 134 is being mounted on to boat 16. "Engaged position" is the position the feature is in while snowmobile 134 is mounted on boat 16. This embodiment of thrust plates 206 includes retractable steps 209. In engaged position shown in FIG. 12A, steps 209 are extended. In unengaged position shown in FIG. 12B, steps 209 are retracted and a third of the height of steps 209 in engaged position so that they are flat enough to allow snowmobile 134 to mount boat 16. Thrust plates 206 shown in FIGS. 12A and 12B are not the only embodiments of thrust plates 206 of boat 16 of the present invention. Other embodiments, for example, are shown in FIGS. 10A and 10C.

Now referring to FIGS. 13A and 13B, mounting bars 207 are shown in engaged and unengaged positions, respectively. Mounting bars 207 consist of hydraulic cylinders 210, lifting arm 213, and support arm 223. Hydraulic cylinders 210 are flat in both engaged and unengaged positions, are affixed to hull recess floor 203, and are disposed on either side of snowmobile opening 40. Support arms 223 are affixed on one end to hull recess floor 203 and on the other to lifting arm 213. At either end, support arms 223 include features allowing support arms 223 to move between engaged and unengaged positions. In unengaged position shown in FIG. 13B, mounting bar 207 is essentially flat so that snowmobile 134 will be able to slide over mounting bar 207 unimpeded. In engaged position shown in FIG. 13B, hydraulic cylinders 210 are extended, and lifting arm and support arms 223 arm angled upward. Mounting bar 207 in engaged position both supports snowmobile 134 and holds it in position upon boat 16.

Now referring to FIGS. 14A and 14B, mounting bar 207, thrust plates 206, clamps 304, cables 242, and rear handle 236 of snowmobile 134 are shown. Although not shown, thrust plates 206 in these FIGS. include springs that force thrust plates 206 into an unengaged position. Cables 242 extend thrust plates 206 as snowmobile 134 is lifted by mounting bar 207. Cable 242 is slack when thrust plates 206 are unengaged. Cable 242 is an exemplary method of accomplishing the thrust plate lifting. Slotted arms, for example, may replace cable 242 to accomplish the lifting. One of ordinary skill in the art will recognize that these are but two examples of several ways in which this may be accomplished. Clamps 304 secure rear handle 236 of snowmobile 134. One end of cable 242 is attached to clamp 304.

Figure 15A:
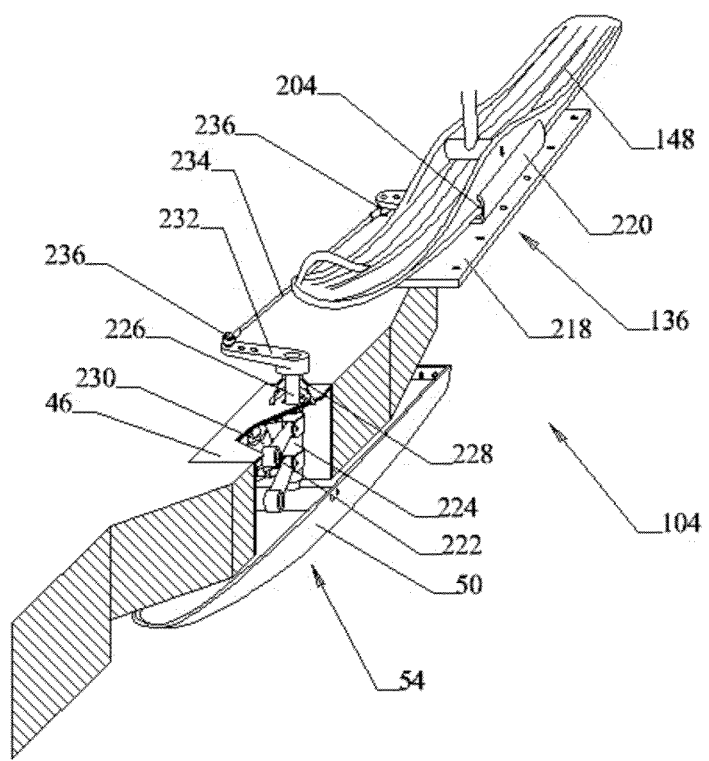
FIG. 15A is an exploded perspective view of the steering mechanism of the combination of the second version of the present invention.

Now referring to FIGS. 15A and 15B, exploded perspective view of two embodiments of boat steering mechanism 204 of the combination of the second version of the present invention is shown. Boat steering mechanism 104 includes boat ski attachment mechanism 54 and snowmobile ski attachment mechanism 136. Snowmobile ski attachment mechanism 54 of the second version includes ski saddles 204 disposed within hull recess 214 on top 30 of boat 16. Ski saddles 204 each include clamp mechanism 220 that affixes skis 148 to ski saddles 204. Ski saddles 204 ride via a sealed bearing (not shown) on a movable mounting plate 218 attached to floor 203 of hull recess 214. The bearings allow ski saddles 204, and therefore snowmobile skis 148, to pivot.

Boat ski attachment mechanism 54 includes a-arms 222, vertical cylinders 224, kingpins 226, boot seals 228, and bushings 230. Under-hull skis 50 are secured to the sides of aluminum steering pods 46, which are integral to hull 28 through a-arms 222 and bushings 230, allowing articulation of under-hull ski 50. In the second version of boat 16 of the present invention, steering pods 46 are not visible above top 30 of hull 28, as they are in the first version. The geometry of a-arms 222 allows tails 239 of under-hull skis 50 to travel while keeping tips 52 of under-hull skis 50 nested behind bow step 112, preventing them from being caught on foreign objects. A-arms 222 are attached to vertical cylinders 224, which carry kingpins 226 in sealed bearings. Kingpins 226 are sealed to hull 28 with boot seals 228. A-arms 222 may be dampened with urethane bushings 230 attached to the lower part of a-arms 222 and the upper portion of steering pods 46. Dampening may also be accomplished with conventional coil-over springs or shock absorbers, or with torsion bars.

Snowmobile ski attachment mechanism 136 includes first and second steering arms 232, 233, bearings (not shown), shaft 234, steering link 216, and rudder 240 (the latter two of which are shown in FIG. 10). First steering arm 232 is disposed at the top of kingpin 226 of boat ski attachment mechanism 54. Second steering arm 233 is integral to ski saddle 204. Both first and second steering arms 232, 233 include several holes for travel adjustment. First and second steering arms 232, 233 are connected via shaft 216 with spherical bearings on each end where they are attached to kingpin 226 and ski saddle 204, respectively.

Now referring to FIGS. 16A and 16B, the combination of boat 16 with snowmobile 134 is shown in engaged and unengaged positions, respectively. In FIG. 16A, mounting bar 207 and thrust plates 206 are raised. In FIG. 16B, we see mounting bar 207 lying flat so as to allow snowmobile 134 to pass onto boat 16 unimpeded. Thrust plates 206 are also retracted, but are not visible in this view.

Now referring to FIGS. 17A and 17B, the second version of boat 16 is shown with jet drive insert 300 and with outboard insert 302, respectively. As discussed above, boat steering mechanism 104, lifting arm 213, and thrust plates 206 are removed when boat 16 is being used as a boat only and not in concert with snowmobile 134.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

We claim:

1. A boat comprising:
   a bow, an aft, a port side, a starboard side, and a mid-ship;
   a hull comprising a top and a bottom, wherein said bottom of said hull comprises under-hull skis comprising tips and tails, and said bottom of said hull further comprises a bow step positioned proximate to said tips of said under-hull skis;
   a snowmobile opening comprising a cutaway of said hull extending into said hull from said aft of said boat and disposed halfway between said port and starboard sides of said boat; and
   a boat steering mechanism comprising two boat ski attachment mechanisms on said port and starboard sides of said boat and two snowmobile ski attachment mechanisms on said port and starboard sides of said boat.

2. The boat as claimed in claim 1, further comprising a hull recess extending from said mid-ship of said boat to said aft of said boat.

3. The boat as claimed in claim 2, wherein each of said two boat ski attachment mechanisms of said boat steering mechanism comprise a steering pod, a series of a-arms, a vertical cylinder, and a kingpin;

wherein each of said under-hull skis are secured to said steering pod and said steering pod is integral to said hull through said series of a-arms;
wherein said series of a-arms are attached to said vertical cylinder;
wherein said kingpin is disposed within said vertical cylinder; and
wherein said kingpin extends above said top of said hull.

4. The boat as claimed in claim 3, wherein each of said snowmobile ski attachment mechanisms of said boat steering mechanism comprise a sealed bearing, a mounting plate, and a ski saddle with a clamp mechanism;
wherein said mounting plate is integral to said top of said hull within said hull recess; and
wherein said ski saddle is integral to said mounting plate through said sealed bearing.

5. The boat as claimed in claim 4, wherein said boat steering mechanism further comprises a first steering arm, a shaft, a second steering arm, a steering link, and a rudder;
wherein said first steering arm is attached to said kingpin of said boat ski attachment mechanism, where said kingpin extends above said hull of said boat;
wherein said second steering arm is attached to said ski saddle of said snowmobile ski attachment mechanism;
wherein said shaft is attached to and connects said first and second steering arms;
wherein said rudder is attached to said aft of said boat; and
wherein said steering link is attached to and connects said second steering arm and said rudder.

6. The boat as claimed in claim 1, further comprising thrust plates disposed within said snowmobile opening of said boat, at said aft of said boat.

7. The boat as claimed in claim 6, wherein said thrust plates comprise retractable steps.

8. The boat as claimed in claim 1, further comprising a mounting bar comprising:
hydraulic cylinders on said port and starboard sides of said boat, wherein said hydraulic cylinders are supported in a frame integral to said top of said hull;
a lifting arm disposed between said hydraulic cylinders and capable of actuating through said hydraulic cylinders; and
support arms integral to said hull and said lifting arm.

9. The boat as claimed in claim 1, further comprising a rail extending around said starboard side, said bow, and said port sides of said boat, and integral to said top of said hull of said boat.

10. The boat as claimed in claim 1, further comprising:
an inflatable tube extending around said starboard side, said bow, and said port sides of said boat, and integral to said hull of said boat;
a raised area on said top of said hull disposed between said starboard and said port sides of said boat and extending from said aft of said boat to a position proximate to said bow of said boat, wherein said bow opening is disposed within said raised area;
a tubular bow structure affixed to said top of said hull of said boat proximate to said raised area where said raised area is proximate to said bow, wherein said tubular bow structure is adjustable in height;
a steering pod on either side of said tubular bow structure;
a tubular aft structure affixed to said top of said hull of said boat at said aft of said boat, wherein said tubular aft structure is capable of moved between a position perpendicular to said hull and a position essentially flush with said hull; and
wherein said transom comprises a center transom integral to said inflatable tube and a center transom insert sized and dimensioned to mate with said center transom so as to form a watertight seal at said aft of said boat.

11. The boat as claimed in claim 10, wherein each of said boat ski attachment mechanism is housed beneath said steering pod and comprises a springed piston, a series of a-arms, a vertical cylinder, and a kingpin, wherein said springed piston is attached to said series of a-arms, said series of a-arms is attached to said vertical cylinder, and said kingpin is housed within said vertical cylinder.

12. The boat as claimed in claim 11, wherein said boat steering mechanism further comprises a first steering arm, a first shaft, a second shaft, a cylinder, a third shaft, and a second steering arm;
wherein said first steering arm is affixed to said kingpin of said boat ski attachment mechanism;
wherein said first steering arm is also connected to said second shaft via said first shaft;
wherein said second shaft travels through said steering pod to said top of said hull and is disposed within said cylinder;
wherein said third shaft is connected to said second shaft and said second steering arm; and
wherein said second steering arm is also attached to said snowmobile ski attachment mechanism.

13. A combination comprising a snowmobile with a steering mechanism and a boat, wherein said boat is designed such that said snowmobile may be mounted on said boat and said boat may be steered via said steering mechanism of said snowmobile, wherein said boat comprises:
a bow, an aft, a port side, a starboard side, and a mid-ship;
a hull comprising a top and a bottom, wherein said bottom of said hull comprises under-hull skis comprising tips and tails, and said bottom of said hull further comprises a bow step positioned proximate to said tips of said under-hull skis;
a snowmobile opening comprising a cutaway of said hull extending into said hull from said aft of said boat and disposed halfway between said port and starboard sides of said boat;
a boat steering mechanism comprising two boat ski attachment mechanisms on said port and starboard sides of said boat and two snowmobile ski attachment mechanisms on said port and starboard sides of said boat;
a hull recess extending from said mid-ship of said boat to said aft of said boat;
a mounting bar; and
thrust plates disposed within said snowmobile opening of said boat, at said aft of said boat.

14. The combination as claimed in claim 13, wherein each of said two boat ski attachment mechanisms of said boat steering mechanism of said boat comprise a steering pod, a series of a-arms, a vertical cylinder, and a kingpin;
wherein each of said under-hull skis are secured to said steering pod and said steering pod is integral to said hull through said series of a-arms;
wherein said series of a-arms are attached to said vertical cylinder;
wherein said kingpin is disposed within said vertical cylinder; and
wherein said kingpin extends above said top of said hull.

15. The combination as claimed in claim 14, wherein each of said snowmobile ski attachment mechanisms of said boat steering mechanism of said boat comprise a sealed bearing, a mounting plate, and a ski saddle with a clamp mechanism;

wherein said mounting plate is integral to said top of said hull within said hull recess; and wherein said ski saddle is integral to said mounting plate through said sealed bearing.

16. The boat as claimed in claim 15, wherein said boat steering mechanism further comprises a first steering arm, a shaft, a second steering arm, a steering link, and a rudder;

wherein said first steering arm is attached to said kingpin of said boat ski attachment mechanism, where said kingpin extends above said hull of said boat;

wherein said second steering arm is attached to said ski saddle of said snowmobile ski attachment mechanism;

wherein said shaft is attached to and connects said first and second steering arms;

wherein said rudder is attached to said aft of said boat; and wherein said steering link is attached to and connects said second steering arm and said rudder.

17. The combination as claimed in claim 13, wherein in said boat:

said thrust plates comprise retractable steps; and said mounting plates comprise:

hydraulic cylinders on said port and starboard sides of said boat, wherein said hydraulic cylinders are supported in a frame integral to said top of said hull;

a lifting arm disposed between said hydraulic cylinders and capable of actuating through said hydraulic cylinders; and support arms integral to said hull and said lifting arm.

18. A boat comprising:

a bow, an aft, a port side, a starboard side, and a mid-ship;

a hull comprising a top and a bottom, wherein said bottom of said hull comprises under-hull skis comprising tips and tails, and said bottom of said hull further comprises a bow step positioned proximate to said tips of said under-hull skis;

a snowmobile opening comprising a cutaway of said hull extending into said hull from said aft of said boat and disposed halfway between said port and starboard sides of said boat; and an insert sized and dimensioned to fill said snowmobile opening such that said boat is seaworthy, wherein said insert is one of a group comprising an outboard insert and a jet drive insert.

19. The boat as claimed in claim 18, wherein said boat further comprises:

a hull recess extending from said mid-ship of said boat to said aft of said boat; and a rail extending around said starboard side, said bow, and said port sides of said boat, and integral to said top of said hull of said boat.

20. The boat as claimed in claim 18, wherein said boat further comprises an inflatable tube extending-around said starboard side, said bow, and said port sides of said boat, and integral to said hull of said boat.

* * * * *